(12) United States Patent
Hangai et al.

(10) Patent No.: US 8,820,610 B2
(45) Date of Patent: Sep. 2, 2014

(54) USING FRICTION STIR PROCESSING TO FORM FOAMED METAL PRECURSORS

(75) Inventors: Yoshihiko Hangai, Gunma (JP); Takao Utsunomiya, Tokyo (JP)

(73) Assignees: National University Corporation Gunma University, Maebashi-shi (JP); Shibaura Institute of Technology, Tokyo (JP)

( * ) Notice: Subject to any disclaimer, the term of this patent is extended or adjusted under 35 U.S.C. 154(b) by 0 days.

(21) Appl. No.: 13/502,042

(22) PCT Filed: Oct. 13, 2010

(86) PCT No.: PCT/JP2010/067979
§ 371 (c)(1),
(2), (4) Date: Apr. 13, 2012

(87) PCT Pub. No.: WO2011/046152
PCT Pub. Date: Apr. 21, 2011

(65) Prior Publication Data
US 2012/0202089 A1    Aug. 9, 2012

(30) Foreign Application Priority Data

Oct. 14, 2009  (JP) ................................. 2009-237447

(51) Int. Cl.
*B23K 20/12*   (2006.01)
(52) U.S. Cl.
USPC ..................................................... 228/112.1
(58) Field of Classification Search
None
See application file for complete search history.

(56) References Cited

U.S. PATENT DOCUMENTS 3,731,959 A * 5/1973 Calton et al. .................. 403/271
4,713,277 A * 12/1987 Akiyama et al. .............. 428/131

(Continued)

FOREIGN PATENT DOCUMENTS

DE    1 048 360        1/1959
DE    40 18 360 C1     5/1991

(Continued)

OTHER PUBLICATIONS

International Search Report issued on Jan. 18, 2011 in PCT/JP10/067979 filed on Oct. 13, 2010.

*Primary Examiner* — Kiley Stoner
*Assistant Examiner* — Carlos Gamino
(74) *Attorney, Agent, or Firm* — Oblon, Spivak, McClelland, Maier & Neustadt, L.L.P.

(57) ABSTRACT

The present invention provides a qualitatively-stable functionally gradient material precursor having gradient material composition, as well as a production method of the functionally gradient material precursor, at low cost. Further, the present invention provides a functionally gradient material having gradient material composition, or having both gradient material composition and gradient porosity, so as to achieve high-functionality; as well as a production method of the functionally gradient material. A functionally gradient material precursor is formed by the steps of: forming plural kinds of metal foam precursors, each obtained by performing heat treatment on a metal member so that a plurality of pores are generated within the metal member, by making the material composition of the metal member different; and friction stir welding the plural kinds of metal foam precursors. Further, a functionally gradient material is formed by performing heat treatment on the functionally gradient material.

3 Claims, 19 Drawing Sheets

(56) References Cited

U.S. PATENT DOCUMENTS

| | | | |
|---|---|---|---|
| 4,829,152 A * | 5/1989 | Rostoker et al. | 219/78.02 |
| 5,112,697 A * | 5/1992 | Jin et al. | 428/613 |
| 5,151,246 A | 9/1992 | Baumeister et al. | |
| 6,146,780 A * | 11/2000 | Cisar et al. | 429/435 |
| 6,605,368 B2 * | 8/2003 | Smith | 428/613 |
| 6,843,876 B1 * | 1/2005 | Kent | 156/280 |
| 7,087,853 B2 * | 8/2006 | Holte et al. | 219/75 |
| 7,159,931 B2 * | 1/2007 | Chernoff et al. | 296/187.01 |
| 7,252,907 B2 * | 8/2007 | Takeuchi et al. | 429/235 |
| 7,396,380 B2 * | 7/2008 | Kretz et al. | 75/415 |
| 7,594,325 B2 * | 9/2009 | Read | 29/889.71 |
| 7,625,654 B2 * | 12/2009 | Vyas et al. | 429/492 |
| 2007/0151697 A1 | 7/2007 | Wittebrood et al. | |

FOREIGN PATENT DOCUMENTS

| | | |
|---|---|---|
| DE | 41 01 630 | 12/1991 |
| JP | 2000 176658 | 6/2000 |
| JP | 2005040851 A * | 2/2005 |
| JP | 2006 097075 | 4/2006 |
| JP | 2006150389 A * | 6/2006 |
| JP | 2006 523771 | 10/2006 |
| JP | 2006289409 A * | 10/2006 |
| JP | 2006 307295 | 11/2006 |
| JP | 3895292 | 3/2007 |
| WO | 2010 029864 | 3/2010 |

* cited by examiner

7(11) ⟷ 8(12)

7(11) ⟷ 8(12)

7(15) ⟷ 8(16)

7(15) ⟷ 8(16)

400 µ

400 µ

Fe

400 µ

400 µ

USING FRICTION STIR PROCESSING TO FORM FOAMED METAL PRECURSORS

TECHNICAL FIELD

The present invention relates to methods for producing a functionally gradient material precursor (i.e., precursor for functionally gradient material) and a functionally gradient material in which material composition, or both material composition and porosity, varies continuously or stepwisely, and a functionally gradient material precursor and a functionally gradient material produced by such methods.

BACKGROUND ART

Porous aluminum, as the representative of metal foam, is a multifunctional material with lightweight property and excellent bombarding-energy absorbing property, and is expected to serve as a high-functional material capable of ensuring compatibility between improving fuel efficiency and improving collision safety of automobiles.

Many methods for producing the porous aluminum have been proposed until now; among these propositions, a precursor method is a representative one (see Non-patent document 1). The precursor method is adapted to produce a so-called precursor (a metal foam precursor) in which blowing agent powder is previously mixed into an aluminum base material. In the precursor method, after the precursor has been formed, the precursor is heated so that the blowing agent is decomposed to generate gas, and the aluminum base material is blown out by the gas to become a porous material. By the above process, production of the porous aluminum is completed.

Further, as examples of the precursor method for producing the precursor, there are a powder metallurgical method (see Non-patent document 2, Patent document 1, and Patent document 2) and a rolling-bonding method (see Non-patent document 3 and Patent document 3).

In the powder metallurgical method, base material powder and blowing agent powder are mixed until they become homogeneously mixed powder, and further, the mixed powder is subjected to a number of operations such as hot extrusion, hot rolling and the like, so that the mixed powder is solidified to become a precursor.

In the rolling-bonding method, a plurality of plate materials (as base materials) are prepared, a blowing agent is sandwiched between the plate materials, and the plate materials are rolled at a predetermined rolling reduction of 50%, for example, so that the plate materials are joined to each other. Further, the rolling process is repeatedly performed so that the blowing agent homogeneously disperses within the plate materials, to thereby obtain a precursor.

PRIOR ART DOCUMENTS

Patent Documents

[Patent document 1] German Unexamined Patent Application Publication No. 4018360
[Patent document 2] German Unexamined Patent Application Publication No. 4101630
[Patent document 3] Japanese Patent Publication No. 3895292

Non-Patent Documents

[Non-patent document 1] J. Banhart, Manufacture, characterization and application of cellular metals and metal foams. Progress in Materials Science, 2001. 46(6): pp 559-632

[Non-patent document 2] F. Baumgartner, I. Duarte and J. Banhart, Industrialization of powder compact foaming process. Advanced Engineering Materials, 2000. 2(4): pp 168-174

[Non-patent document 3] K. Kitazono, E. Sato, and K. Kuribayashi, Novel manufacturing process of closed-cell aluminum foam by accumulative roll-bonding. Scripta Materialia, 2004. 59(4): pp 495-498

DISCLOSURE OF THE INVENTION

Problems to be Solved by the Invention

However, problems with the aforesaid powder metallurgical method include that the base material powder is expensive compared with the generally distributed materials such as plate material, and that, in the case where the base material is aluminum alloy powder, an oxide film will be formed on the surface of powder and therefore it is difficult to produce a fully-dense precursor.

Advantages of the rolling-bonding method are that inexpensive plate material can be used and existing rolling device can be used; however, problems with the rolling-bonding method include that, since the plate materials are joined to each other by rolling, pretreatment such as annealing, it is necessary to perform surface treatment of the joining surface and the like, and it is necessary to perform heat treatment before and after rolling.

On the other hand, in order to further expand the use of the porous aluminum, it is preferred that the porous aluminum is provided with gradient function. For example, if material function of the porous aluminum can be caused to vary in a gradient manner so that the surface of the porous aluminum has high corrosion resistance and the interior of the porous aluminum has high mechanical strength, it will be possible to achieve high functional materials capable of being used in various industries such as automobile, aerospace, rail vehicle, medical equipment, building material, industrial machine and the like.

In view of the aforesaid problems, the present invention is intended to provide a qualitatively-stable functionally gradient material precursor having gradient material composition, as well as a production method of the functionally gradient material precursor, at low cost. Further, the present invention is intended to provide a functionally gradient material having gradient material composition, or both gradient material composition and gradient porosity, so as to achieve high-functionality; as well as a production method of the functionally gradient material.

Means for Solving the Problems

To solve the above problems and achieve the object of the present invention, a method for producing a functionally gradient material precursor according to an aspect of the present invention comprises the steps of: forming plural kinds of metal foam precursors, each obtained by performing heat treatment on a metal member so that a plurality of pores are generated within the metal member, by making the material composition of the metal member different; and friction stir welding the plural kinds of metal foam precursors at the same time as or after the step of forming the plural kinds of metal foam precursors.

Further, a method for producing a functionally gradient material precursor according to another aspect of the present invention comprises the steps of: forming a metal foam precursor obtained by performing heat treatment on a metal member so that a plurality of pores are generated within the metal member; and friction stir welding the metal foam precursor and a dense metal portion at the same time as or after the step of forming the metal foam precursor, wherein the dense metal portion has different material composition from that of the metal member.

With the methods for producing the functionally gradient material precursor according to the present invention, a functionally gradient material precursor integrated by a plurality of metal foam precursors having mutually different material compositions, or a functionally gradient material precursor integrated by a metal foam precursor and a dense metal portion is formed.

Further, a method for producing a functionally gradient material according to further another aspect of the present invention comprises the steps of: forming plural kinds of metal foam precursors, each obtained by performing heat treatment on a metal member so that a plurality of pores are generated within the metal member, by making the material composition of the metal member different; friction stir welding the plural kinds of metal foam precursors at the same time as or after the step of forming the plural kinds of metal foam precursors, so as to form a functionally gradient material precursor; and performing heat treatment on the functionally gradient material precursor, so that the interior of the metal foam precursors is foamed to form metal foam portions.

Further, a method for producing a functionally gradient material according to further another aspect of the present invention comprises the steps of: forming a metal foam precursor obtained by performing heat treatment on a metal member so that a plurality of pores are generated within the metal member; friction stir welding the metal foam precursor and a dense metal portion at the same time as or after the step of forming the metal foam precursor, wherein the dense metal portion has different material composition from that of the metal member; and performing heat treatment on the functionally gradient material precursor, so that the interior of the metal foam precursor is foamed to form a metal foam portion.

With the methods for producing the functionally gradient material according to the present invention, a functionally gradient material integrated by a plurality of metal foam portions having mutually different material compositions, or a functionally gradient material integrated by a metal foam portion and a dense metal portion is formed. Thus, it is possible to obtain a functionally gradient material whose material composition, or both whose material composition and whose porosity, varies continuously or stepwisely.

Further, a functionally gradient material precursor according to further another aspect of the present invention comprises: one kind of metal foam precursor obtained by performing heat treatment on a metal member so that a plurality of pores are generated within the metal member; and one or more other kinds of metal foam precursor(s) having different material composition(s) from that of the one kind of metal foam precursor, wherein the one kind of metal foam precursor and the one or more other kinds of metal foam precursor(s) are joined to each other so as to be integrated.

Further, a functionally gradient material precursor according to further another aspect of the present invention comprises: a metal foam precursor obtained by performing heat treatment on a metal member so that a plurality of pores are generated within the metal member; and a dense metal portion having different material composition from that of the metal foam precursor and joined to a desired surface of the metal foam precursor.

Further, a functionally gradient material according to further another aspect of the present invention comprises: plural metal foam portions, wherein metal foam portions are formed by the steps of: forming plural kinds of metal foam precursors, each obtained by performing heat treatment on a metal member so that a plurality of pores are generated within the metal member, by making the material composition of the metal member different; friction stir welding the plural kinds of metal foam precursors at the same time as or after the step of forming the plural kinds of metal foam precursors, so as to form a functionally gradient material precursor; and performing heat treatment on the functionally gradient material precursor, so that the interior of the plural kinds of metal foam precursors is foamed to form plural metal foam portions.

Further, a functionally gradient material comprising: according to further another aspect of the present invention comprises: a metal foam portion, wherein the metal foam portion is formed by the steps of: forming a metal foam precursor obtained by performing heat treatment on a metal member so that a plurality of pores are generated within the metal member; friction stir welding the metal foam precursor and a dense metal portion at the same time as or after the step of forming the metal foam precursor, wherein the dense metal portion has different material composition from that of the metal member, so as to form a functionally gradient material precursor; and performing heat treatment on the functionally gradient material precursor, so that the interior of the metal foam precursor is foamed to form the metal foam portion.

Advantages of the Invention

According to the present invention, it is possible to obtain a qualitatively-stable functionally gradient material precursor having gradient material composition at low cost. Further, it is possible to obtain a functionally gradient material having gradient material composition, or having both gradient material composition and gradient porosity, so as to achieve high-functionality.

BEST MODES FOR CARRYING OUT THE INVENTION

An example of a functionally gradient material precursor, a functionally gradient material and a method for producing the functionally gradient material precursor and the functionally gradient material according to embodiments of the present invention will be described below with reference to FIG. 1A to 35. The embodiments of the present invention will be described in the following order. Incidentally, the present invention is not limited to this example.
1. First embodiment: Examples of functionally gradient material precursor and functionally gradient material formed of different materials
   Modification 1: a case where three different materials are used
   Modification 2: a case where porosity is caused to vary
   Modification 3: a case where additive material is changed
2. Second embodiment: Examples of functionally gradient material precursor and functionally gradient material having a dense metal joined thereto
3. Third embodiment: Examples in which die-cast materials are used <1. First Embodiment>

A method for producing a functionally gradient material precursor and a functionally gradient material according to a first embodiment of the present invention will be described below with reference to FIGS. 1A to 17B.

Figure 1A:
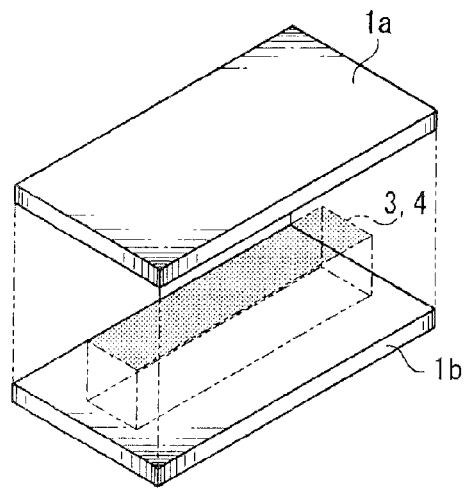
FIGS. 1A and 1B are schematic configuration views showing a process for producing a functionally gradient material precursor and a functionally gradient material according to a first embodiment of the present invention.
Figure 2A:
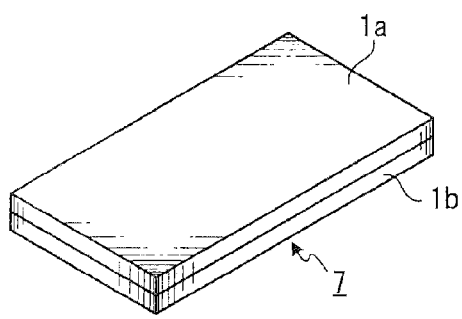
FIGS. 2A and 2B are configuration schematic views showing the process for producing the functionally gradient material precursor and the functionally gradient material according to the first embodiment.
Figure 2B:
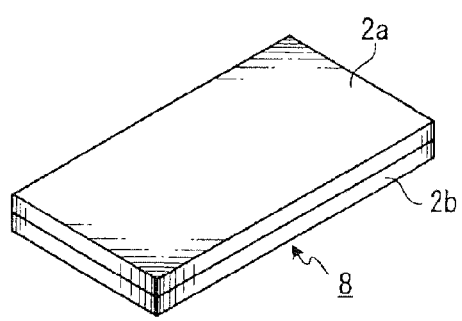

First, as shown in FIG. 1A, a pair of first metal plates 1$a$, 1$b$ are laminated to each other with a blowing agent 3 and a pore structure stabilization agent 4 sandwiched in between, so as to form a first laminate 7 shown in FIG. 2A. In the same manner, a pair of second metal plates 2$a$, 2$b$ are laminated to each other with the blowing agent 3 and the pore structure stabilization agent 4 sandwiched in between, so as to form a second laminate 8 shown in FIG. 2B, wherein the material composition of the second metal plates 2a, 2b is different from that of the first metal plates 1a, 1b.

A pair of aluminum and an alloy thereof, a pair of magnesium and an alloy thereof, a pair of iron and an alloy thereof, a pair of copper and an alloy thereof, and the like can each be used as the first metal plates 1a, 1b and the second metal plates 2a, 2b. At this time, the pair of first metal plates 1a, 1b, which constitute the first laminate 7, and the pair of second metal plates 2a, 2b, which constitute the second laminate 8, are formed of different material compositions.

In the present embodiment, rolled plates of aluminum with a purity of 99.5% (JIS A1050) are used as the first metal plates 1a, 1b. Further, rolled plates of an aluminum alloy (JIS A6061), which mainly contains aluminum (Al), silicon (Si) and magnesium (Ma), are used as the second metal plates 2a, 2b. Further, the first metal plates 1a, 1b and the second metal plates 2a, 2b of the present embodiment are rolled plates each having a length of 210 mm, a width of 80 mm, and a thickness of 3 mm. Note that, although the pair of first metal plates 1a, 1b and the pair of second metal plates 2a, 2b have the same thickness in the present embodiment, they may have different thickness.

The type of the blowing agent 3 is not particularly limited as long as it does not have any negative effect on the first metal plates 1a, 1b and the second metal plates 2a, 2b; for example, an inorganic blowing agent (such as titanium hydride, zirconium hydride, calcium carbonate or the like) and an organic blowing agent (such as azo compound, hydrazine derivative or the like) can be used as the blowing agent 3.

Further, alumina, silicon carbide, silicon dioxide or the like can be used as the pore structure stabilization agent 4.

In the present embodiment, titanium hydride ($TiH_2$) powder with a particle size smaller than 45 μm is used as the blowing agent 3, and alumina ($\alpha$-$Al_2O_3$) powder with an average particle size of 1 μm is used as the pore structure stabilization agent 4; and such blowing agent 3 and pore structure stabilization agent 4 are spread between the two first metal plates 1a, 1b and between the two second metal plates 2a, 2b. The spread region covers the places through which a friction stir tool moves in a FSW (Friction Stir Welding) process (which is to be described later). The amount of the spread of the blowing agent 3 and the pore structure stabilization agent 4 is: 1 mass % for the blowing agent 3 and 10 mass % for the pore structure stabilization agent 4, based on the mass of the first metal plates 1a, 1b (or the second metal plates 2a, 2b) of a volume obtained by multiplying the length (5 mm) of a probe of the friction stir tool (which is to be described later) by the area in which the powder is spread.

Figure 3A:
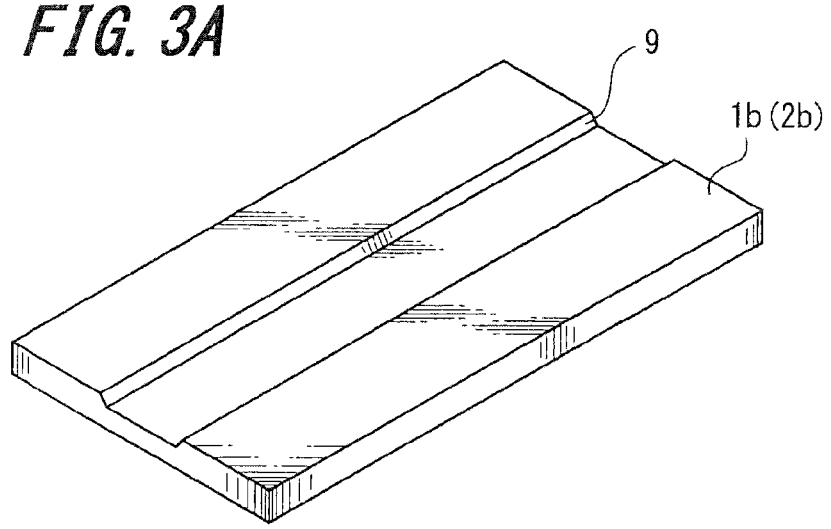
FIGS. 3A and 3B are configuration schematic views showing other examples of a metal plate that constitutes a first laminate and a first laminate, in the first embodiment.
Figure 3B:
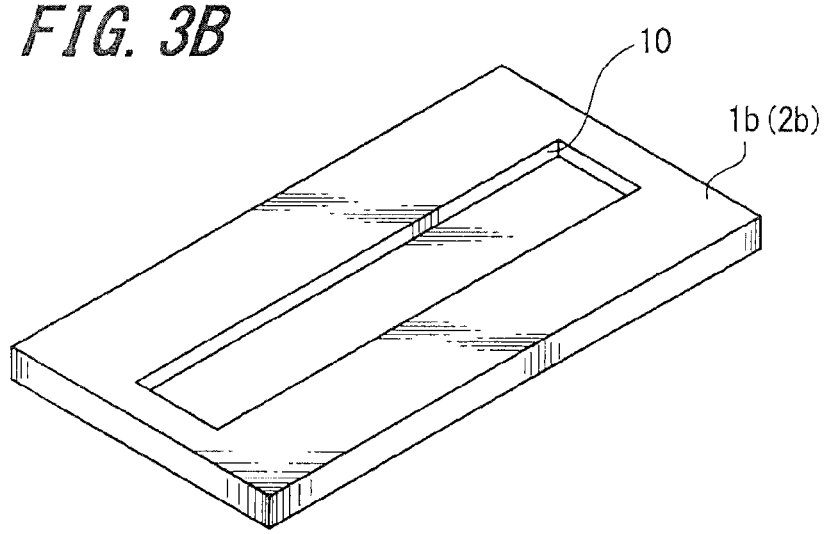

Further, in the case where the first laminate 7 and the second laminate 8 are to be formed, the first metal plate 1b or the second metal plate 2b (which constitutes the lower layer of the first laminate 7 or the second laminate 8) may also be shaped to have a groove 9 (as shown in FIG. 3A) for housing the blowing agent. Further, the first metal plate 1b or the second metal plate 2b may also be shaped to have a recessed portion 10 (as shown in FIG. 3B).

Figure 4:
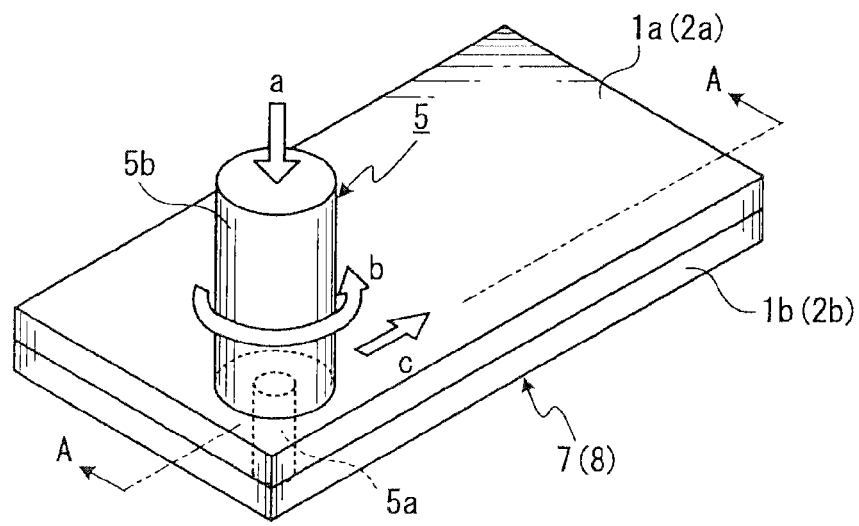
FIG. 4 is a schematic configuration view showing the process for producing the functionally gradient material precursor and the functionally gradient material according to the first embodiment.

Next, as shown in FIG. 4, FSW is performed from one surface of each of the first laminate 7 and the second laminate 8. FSW is a joining method capable of joining a plurality of metal members in contact with each other while stirring the interior of the metal members, by a simple but high-speed process.

Since the FSW in the first laminate 7 and the FSW in the second laminate 8 are respectively performed by the identical process, the FSW in the first laminate 7 and the FSW in the second laminate 8 will be described below at the same time.

The FSW is performed by a friction stir tool 5 that includes a cylindrical main body 5b and a rod-like probe 5a mounted on the tip end of the main body 5b. The probe 5a is penetrated into the first laminate 7 (the second laminate 8) from one end of one surface of the first laminate 7 (the second laminate 8) by rotating the main body 5b and the probe 5a in a direction indicated by arrow "b" at a predetermined rotation speed while pressing the main body 5b and the probe 5a in a direction indicated by arrow "a". Further, the main body 5b and the probe 5a are moved toward the other end of the first laminate 7 (the second laminate 8) in a direction indicated by arrow "c".

Figure 5:
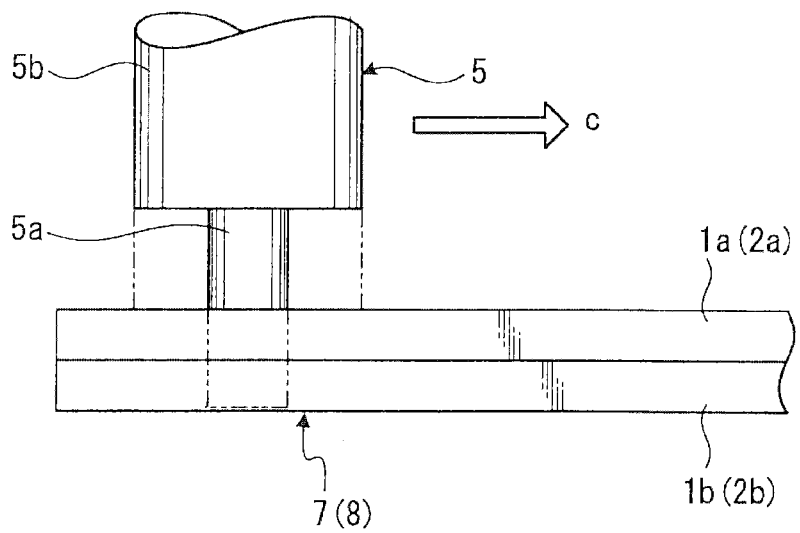
FIG. 5 is a schematic cross section taken along line A-A of FIG. 4.

FIG. 5 is a schematic configuration view showing the cross section taken along line A-A of FIG. 4. In FIG. 5, the solid line indicates a state where the probe 5a of the friction stir tool 5 is brought into contact with the first laminate 7 (the second laminate 8), and the two-dot chain line indicates a state where the probe 5a is pressed so as to be penetrated into the first laminate 7 (the second laminate 8). As shown in FIG. 5, the probe 5a is penetrated through the joining surface between the two first metal plates 1a, 1b of the first laminate 7 so as to be penetrated into the first metal plate 1b of the lower layer.

The FSW process of the present embodiment is performed using a FSW device (trade name: SHH204-720) manufactured by Hitachi Setsubi Engineering Co., Ltd. Further, the friction stir tool 5 used in the present embodiment is made of a high-speed tool steel (JIS SKH51), the diameter of the cylindrical main body 5b is 17 mm, the diameter of the probe 5a is 6 mm, and the length of the probe 5a is 5 mm. Further, in the present embodiment, in the friction stir process of the first laminate 7, the rotation speed of the friction stir tool 5 is set to 2200 rpm, the traverse speed of the friction stir tool 5 is set to 100 mm/min, and the angle of advance of the friction stir tool 5 is set to 3°. Further, in the friction stir process of the second laminate 8, the rotation speed of the friction stir tool 5 is set to 1000 rpm, the traverse speed of the friction stir tool 5 is set to 100 mm/min, and the angle of advance of the friction stir tool 5 is set to 3°.

Figure 6:
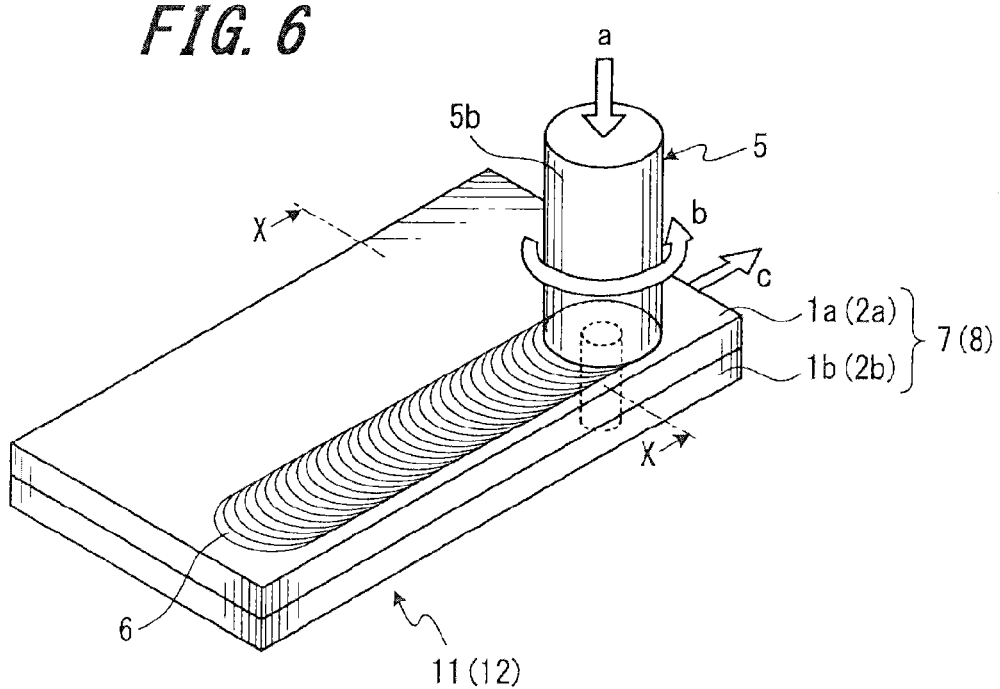
FIG. 6 is a schematic configuration view showing the process for producing the functionally gradient material precursor and the functionally gradient material according to the first embodiment.
Figure 7:
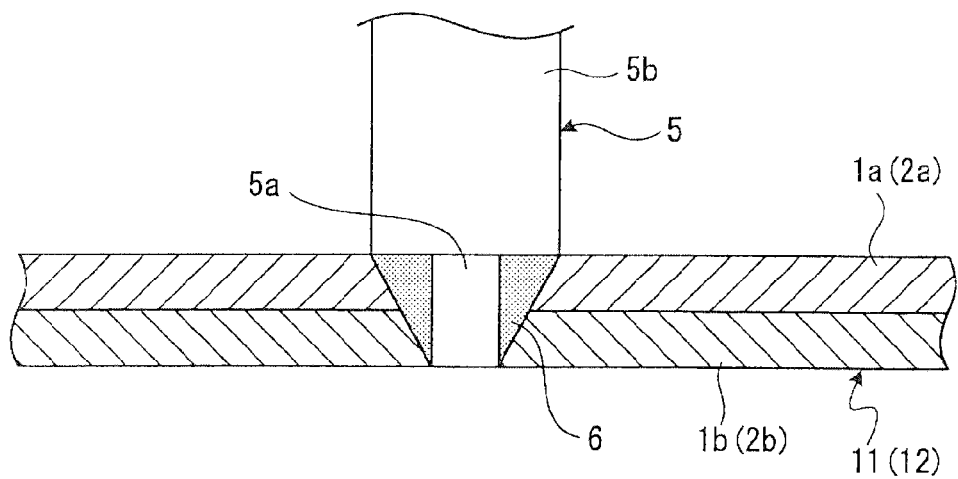
FIG. 7 is a schematic cross section taken along line X-X of FIG. 6.

FIG. 6 is a schematic configuration view showing a state when the FSW is being performed from one end toward the other end of the first laminate 7 (the second laminate 8). FIG. 7 is a schematic cross section taken along line X-X of FIG. 6, and shows the condition of the interior of the first laminate 7 (the second laminate 8) when the FSW is being performed. By performing the FSW, frictional heat is generated between the first laminate 7 (the second laminate 8) and the friction stir tool 5, so that a stir zone 6 is formed in the portion where friction stir is performed. In such a case, actually the frictional heat is generated on the surfaces of the main body 5b and the metal plate, and the metal plate is stirred by the probe 5a. Further, in the stir zone 6, the two first metal plates 1a, 1b (the two second metal plates 2a, 2b), the blowing agent 3 and the pore structure stabilization agent 4 (see FIGS. 1A and 1B) are homogeneously mixed while the two first metal plates 1a, 1b (the two second metal plates 2a, 2b) are joined to each other. By performing the aforesaid process, in the first laminate 7, the blowing agent 3 and the pore structure stabilization agent 4 are mixed into the first metal plates 1a, 1b so as to become a first metal foam precursor 11; and in the second laminate 8, the blowing agent 3 and the pore structure stabilization agent 4 are mixed into the second metal plates 2a, 2b so as to become a second metal foam precursor 12.

Figure 8:
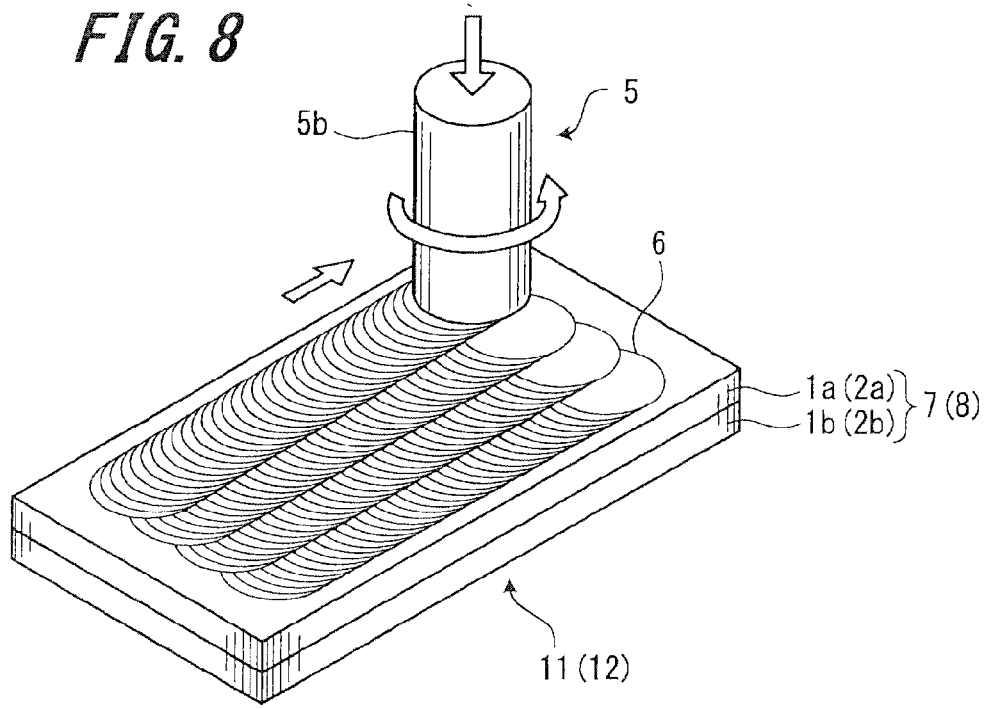
FIG. 8 is a schematic configuration view showing the process for producing the functionally gradient material precursor and the functionally gradient material according to the first embodiment.
Figure 9:
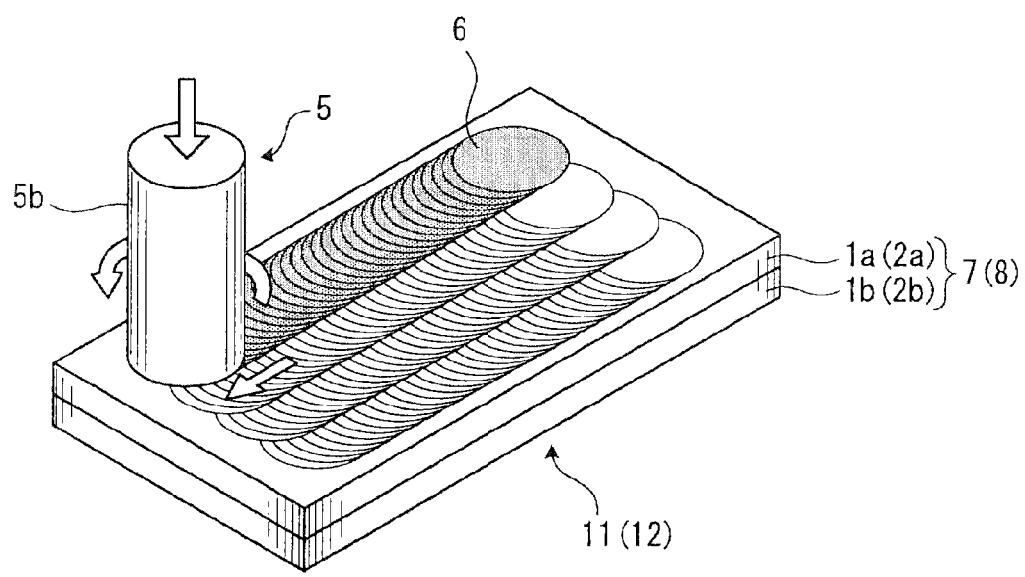
FIG. 9 is a schematic configuration view showing the process for producing the functionally gradient material precursor and the functionally gradient material according to the first embodiment.
Figure 10:
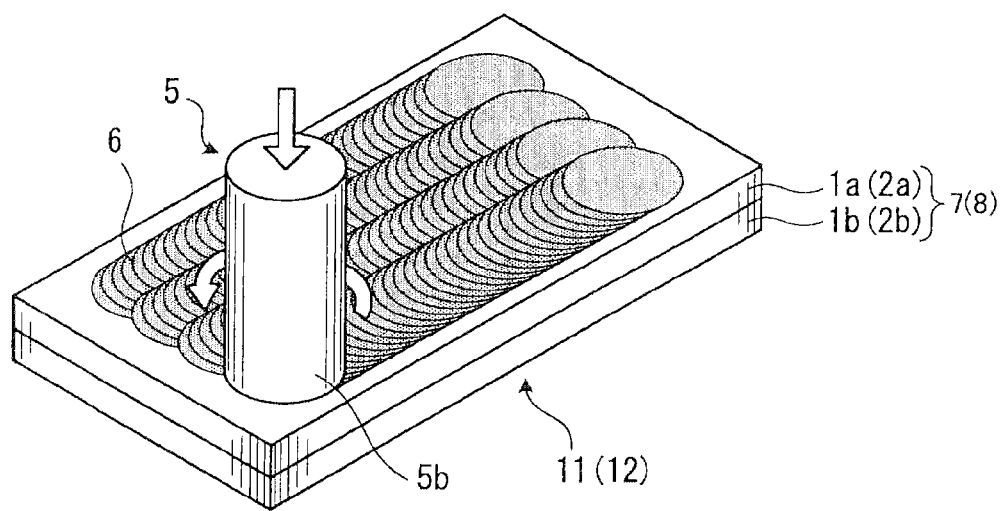
FIG. 10 is a schematic configuration view showing the process for producing the functionally gradient material precursor and the functionally gradient material according to the first embodiment.

In the present embodiment, as shown in FIG. 8, the friction stir is performed a total of four times (four rows) while shifting the probe 5a of the friction stir tool 5 by a distance corresponding to the diameter thereof in a direction perpendicular to the scanning direction of the friction stir (i.e., the direction from the right side to the left side of the paper surface of FIG. 8). Further, as shown in FIG. 9, a second friction stir is performed on the same area where the first friction stir has once been performed, in a scanning direction reverse to the scanning direction of the first friction stir, while shifting the probe 5a by a distance corresponding to the diameter thereof in a direction opposite the direction of the first friction stir (i.e., the direction from the left side to the right side of the paper surface of FIG. 9). In the present embodiment, the friction stir indicated in FIGS. 8 and 9 is performed on the same area again with respect to the second laminate 8 only. In such a manner, in the present embodiment, a multipass method is used, in which the stir process is performed on the same area for multiple times. By using the multipass method, the blowing agent 3 and the pore structure stabilization agent 4 are more homogeneously dispersed within the first metal plates 1a, 1b (the second metal plates 2a, 2b), so that, as shown in FIG. 10, the first metal foam precursor 11 (the second metal foam precursor 12) is formed by performing a desired number of FSW on the same area.

As described in the present embodiment, by repeating the friction stir for a predetermined number of times while shifting the device in the direction perpendicular to the scanning direction, it is possible to obtain the first metal foam precursor 11 (the second metal foam precursor 12) in a wide range; and further, by repeatedly performing the friction stir on the same area for multiple times, it is possible to sufficiently stir the blowing agent. Incidentally, although the present embodiment is described using an example in which the FSW is performed from one surface of each of the first laminate 7 and second laminate 8, the FSW may also be performed from both surfaces of each of the first laminate 7 and second laminate 8.

Figure 11A:
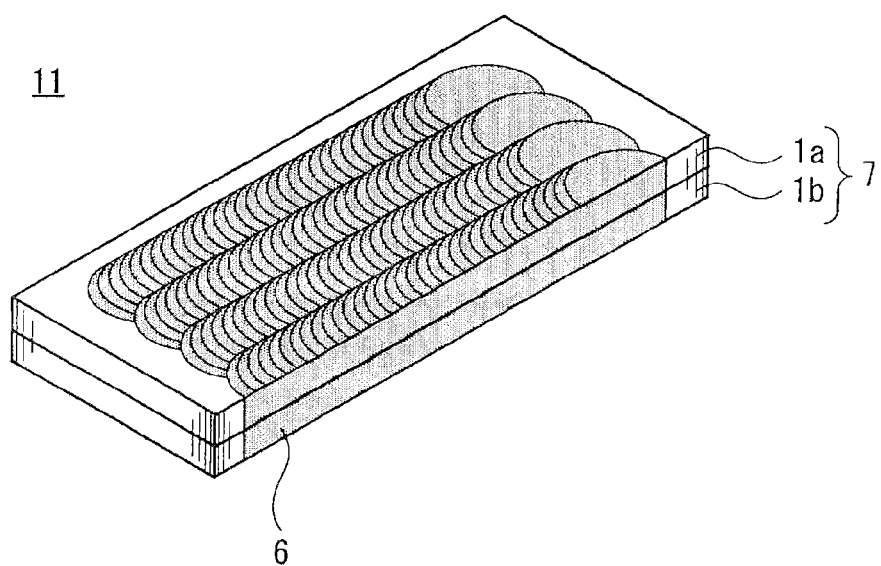
FIGS. 11A and 11B are schematic configuration views showing the process for producing the functionally gradient material precursor and the functionally gradient material according to the first embodiment.
Figure 11B:
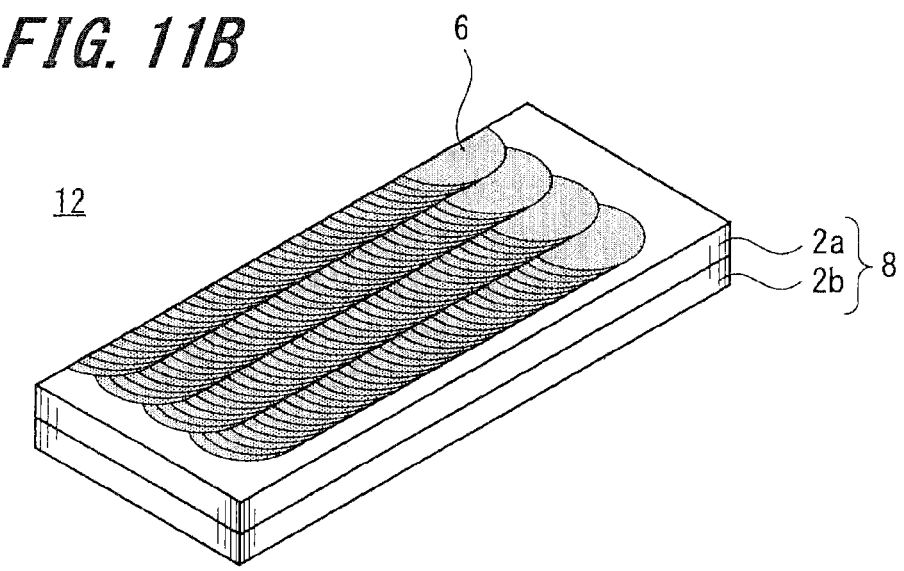

Next, as shown in FIGS. 11A and 11B, an adjustment is performed by respectively machining the first metal foam precursor 11 and the second metal foam precursor 12 so that a surface of the friction-stirred portion (i.e., the stir zone 6) is exposed on an end.

Figure 12:
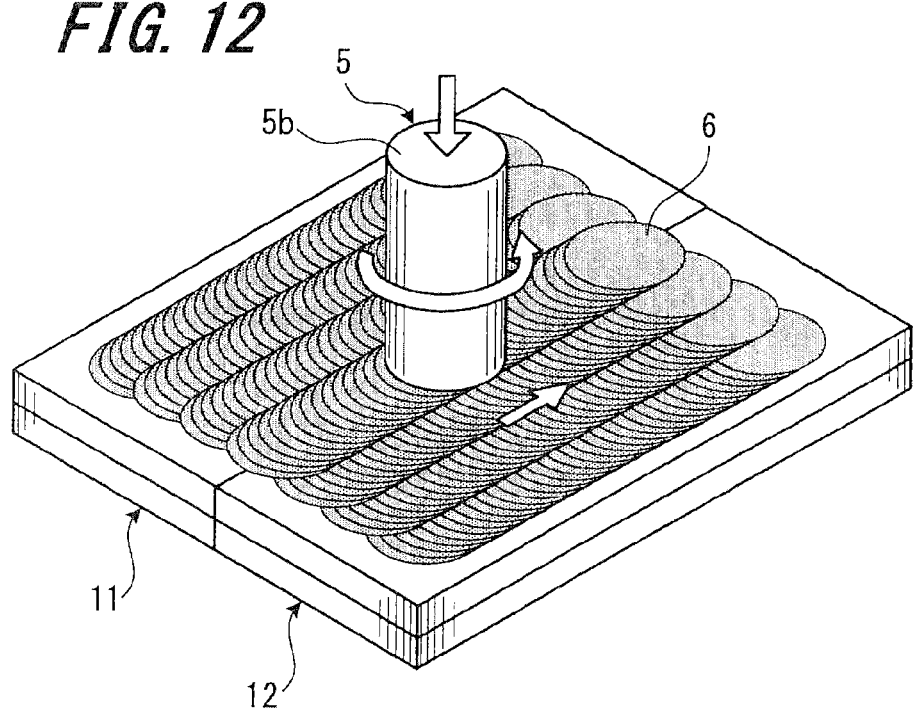
FIG. 12 is a schematic configuration view showing the process for producing the functionally gradient material precursor and the functionally gradient material according to the first embodiment.
Figure 13:
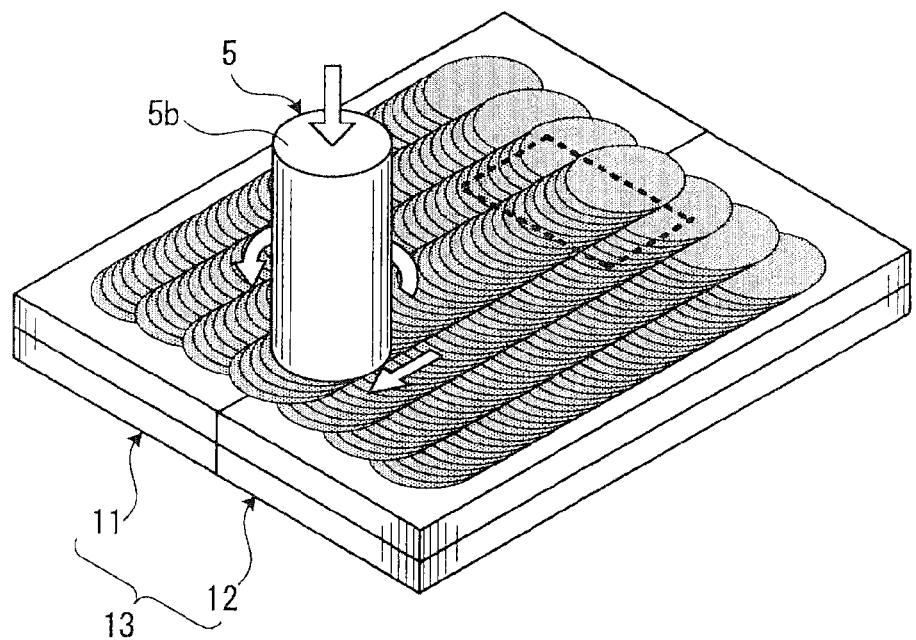
FIG. 13 is a schematic configuration view showing the process for producing the functionally gradient material precursor and the functionally gradient material according to the first embodiment.

Next, as shown in FIG. 12, the surface of the friction-stirred portion of the first laminate 7 and the surface of the friction-stirred portion of the second laminate 8 are butted against each other, and FSW is performed on the contact face of the both laminates. In the present embodiment, the FSW is performed on the contact face under a condition of: the rotation speed of the friction stir tool 5 is set to 1000 rpm, the traverse speed of the friction stir tool 5 is set to 100 mm/min, and the angle of advance of the friction stir tool 5 is set to 3°. Further, the FSW on the contact face may also be performed using the multipass method; and in the present embodiment, as shown in FIG. 13, by reversing the scanning direction, the friction stir is performed twice on the same area.

By performing the aforesaid process, the first metal foam precursor 11 and the second metal foam precursor 12 are joined to each other, and as a result, a functionally gradient material precursor 13 whose material composition varies in a gradient manner is formed.

Figure 14:
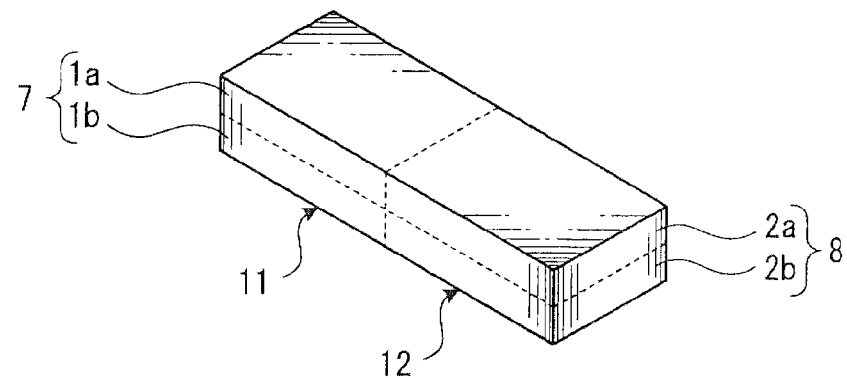
FIG. 14 is a schematic perspective view showing the functionally gradient material precursor produced by the first embodiment.

Next, the functionally gradient material precursor 13 formed in the aforesaid process is heated at a temperature neat the melting point thereof. In the present embodiment, as shown in FIG. 14, the functionally gradient material precursor 13 formed by performing the aforesaid process is cut to obtain a cut portion of the functionally gradient material precursor 13 having a dimension of 35 mm×12 mm×6 mm (a region surrounded by the broken line in FIG. 13), which includes the first metal foam precursor 11 and the second metal foam precursor 12 each having a dimension of 17.5 mm×12 mm×6 mm. In the heat treatment of the present embodiment, the cut portion of the functionally gradient material precursor 13 is put into an electric furnace (trade name: KDF-S80, manufactured by: Denken Co., Ltd.) previously heated to 1003K, held at such temperature for 10 minutes, and then taken out from the electric furnace to be air-cooled.

Figure 15:
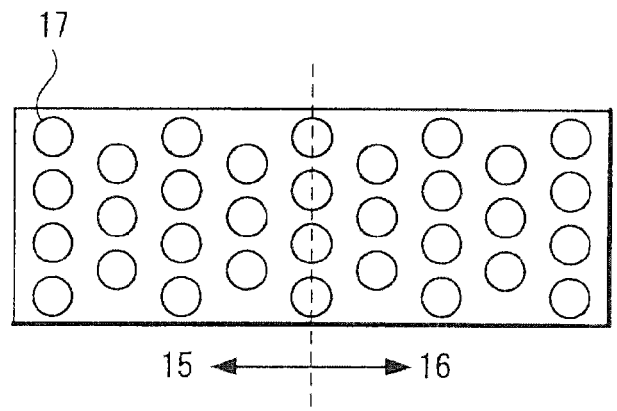
FIG. 15 is a schematic configuration view showing the functionally gradient material produced by the first embodiment.

By performing the aforesaid heat treatment, production of a functionally gradient material 14 shown in FIG. 15 is completed. Incidentally, in the heat treatment process, the blowing agent 3 within of the functionally gradient material precursor 13 is decomposed to generate a plurality of pores. Thus, in the functionally gradient material 14, as shown in FIG. 15, metal foam portions 15, 16 having pores 17 are formed. In the present embodiment, since the first metal plates 1a, 1b (which constitute the first laminate 7) and the second metal plates 2a, 2b (which constitute the second laminate 8) having different material compositions, the metal foam portion 15 formed of pure aluminum is formed in the region that was the first metal foam precursor 11, and the metal foam portion 16 formed of the aluminum alloy is formed in the region that was the second metal foam precursor 12. By the above process, production of the functionally gradient material 14, which has gradient material composition, is completed. Further, in the present embodiment, since the joining portion of the first metal foam precursor 11 and the second metal foam precursor 12 is mixed by the friction stir in the functionally gradient material precursor 13, the intermediate zone between the metal foam portions 15, 16, which are formed of different material compositions, is in a state where different compositions are mixed with each other.

Observation result of the composition distribution of both the functionally gradient material precursor 13 and the functionally gradient material 14 of the present embodiment formed by performing the aforesaid process will be described below.

The details of how the material compositions of the functionally gradient material precursor 13 and the functionally gradient material 14 obtained in the present embodiment vary in a gradient manner were observed by observing the distribution of magnesium (Mg) element, which is contained only in the aluminum alloy applied to the second metal plates 2a, 2b of the second laminate 8. Incidentally, such observation was performed on the cross-sections of the functionally gradient material precursor 13 shown in FIG. 14 and the functionally gradient material 14 shown in FIG. 15, perpendicular to the scanning direction of the FSW.

When observing the cross-sections, the observation cross-sections of both the functionally gradient material precursor 13 and the functionally gradient material 14 were polished by a polishing paper (polished by an emery paper up to No. 1200), and then further polished by electrolytic polishing.

Figure 16A:
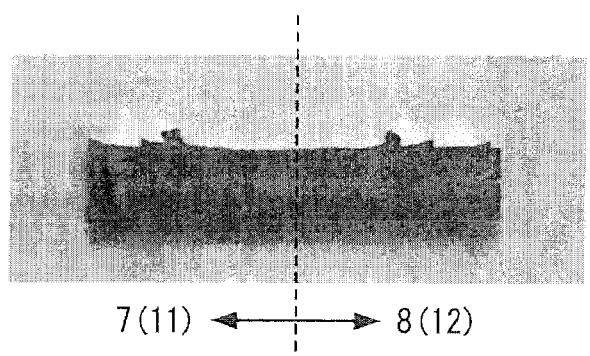
FIG. 16A is a photograph showing the appearance of the functionally gradient material precursor produced by the first embodiment.
Figure 16B:
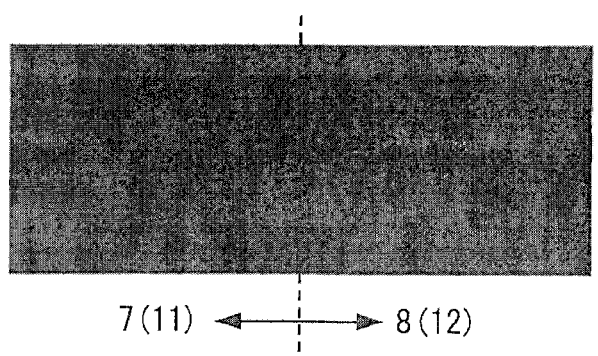
FIG. 16B shows an observation result of EPMA corresponding to the photograph.

FIG. 16A is a photograph showing the appearance of the observation cross-section of the functionally gradient material precursor 13, and FIG. 16B shows the distribution of magnesium (Mg) of the observation cross-section shown in FIG. 16A analyzed by an electron probe micro-analyzer (SPMA). Further, FIG. 17A is a photograph showing the appearance of the observation cross-section of the functionally gradient material 14, and FIG. 17B shows the distribution of magnesium (Mg) of the observation cross-section shown in FIG. 17A analyzed by the Electron Probe Micro-Analysis.

In FIGS. 16A, 16B, 17A and 17B, the left side from the center is the portion formed by the first laminate 7, and the right side from the center is the portion formed by the second laminate 8.

In the observation cross-section shown in FIG. 16A, a number of onion rings, which are concentric rings peculiar to FSW, were confirmed. In the analysis of the electron probe micro-analyzer shown in FIG. 16B, the area containing more magnesium (Mg) element is observed as white-tinged area. As shown in FIG. 16B, much magnesium (Mg) element was observed on the side of the second laminate 8, which is constituted by the second metal plates 2a, 2b made of the aluminum alloy that contains more magnesium (Mg) element. On the other hand, almost no magnesium (Mg) element was observed on the side of the first laminate 7, which is constituted by the first metal plates 1a, 1b made of pure aluminum. Although it is hard to recognize due to limited resolution of the electron probe micro-analyzer, it is known that, in the joining portion of the first laminate 7 and the second laminate 8, some places have magnesium (Mg) element and some places have no magnesium (Mg) element, and the former and the latter are mixed with each other in a complicated manner. Thus, it is observed that, in the functionally gradient material precursor formed in the present embodiment, the percentage of magnesium (Mg) element gradually varies approximately from the left side toward to the right side, and therefore it can be known that composition varies in a gradient manner.

Figure 17A:
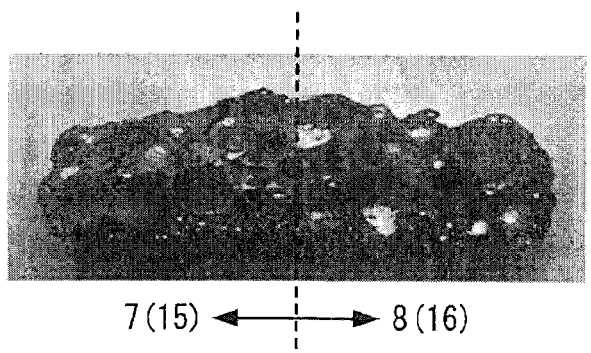
FIG. 17A is a photograph showing the appearance of the functionally gradient material produced by the first embodiment.
Figure 17B:
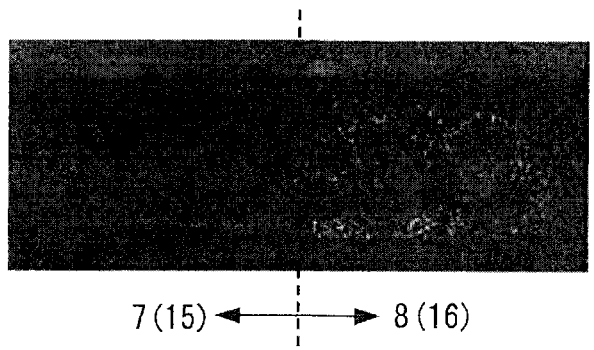
FIG. 17B shows an observation result of EPMA corresponding to the photograph.

Further, as shown in FIG. 17A, in the functionally gradient material 14 formed by the metal foam portions 15, 16 obtained in the present embodiment, the joint between the pure aluminum (which forms the first metal plates 1a, 1b) and the aluminum alloy (which forms the second metal plates 2a, 2b) is completely invisible. Further, as shown in FIG. 17B, almost no magnesium (Mg) element was observed on the left side, which was the pure aluminum that forms the first metal plates 1a, 1b in the functionally gradient material precursor 13. On the other hand, much magnesium (Mg) element was observed on the right side, which was the aluminum alloy that forms the second metal plates 2a, 2b in the functionally gradient material precursor 13. Although it is hard to recognize in FIG. 17B due to limited resolution of the electron probe micro-analyzer, it is observed that, in the original joining portion of the first laminate 7 and the second laminate 8, the percentage of magnesium (Mg) element gradually varies, and therefore it can be known that composition varies in a gradient manner.

As described above, in the functionally gradient material 14 formed in the present embodiment, the metal foam portion 15 (which is made of pure aluminum that is a relatively soft material) and the metal foam portion 16 (which is made of the aluminum alloy that is a material harder than pure aluminum) are joined with each other in a gradient manner. Since the function varies in a gradient manner in one material, in the case where the functionally gradient material 14 of the present embodiment is applied to, for example, automobile components and the like, it is possible to provide components with higher functionality.

Further, with the present embodiment, since it is possible to disperse blowing agent within metal plates to form a metal foam precursor, it is possible to easily produce a qualitatively-stable metal foam precursor at low cost compared with the conventional powder metallurgical method and rolling method. Further, since the friction stir is performed in a state where the blowing agent is sandwiched between the pair of metal plates, the blowing agent does not scatter, so that energy consumption can be reduced, and work environment can be improved.

The present embodiment is described based on an example in which pure aluminum is used as the material of the first metal plates 1a, 1b, and the aluminum alloy is used as the material of the second metal plates 2a, 2b; however, the functionally gradient material precursor 13 and the functionally gradient material 14 of the present embodiment are not limited to such example. The first metal plates 1a, 1b, which constitute the first laminate 7, and the second metal plates 2a, 2b, which constitute the second laminate 8, can be formed so that they have different material compositions, and can be applied to various applications.

Further, although the FSW process for forming the first metal foam precursor 11 and the second metal foam precursor 12 and the FSW process for joining the first metal foam precursor 11 and the second metal foam precursor 12 are separately performed in different steps in the present embodiment, the two FSW processes may also be performed at the same time. In such case, the first laminate 7 and the second laminate 8 are arranged so that they contact with each other, and FSW is performed on all the first laminate 7 and the second laminate 8, so that the stirring and joining process for the interior of the first laminate 7 and the second laminate 8 and the joining process between the first laminate 7 and the second laminate 8 can be performed at the same time. With such method, process number can be reduced.

Further, the present embodiment is described based on an example in which alumina ($Al_2O_3$) (i.e., the pore structure stabilization agent 4) is added on the surface of the first laminate 7 and the surface of the second laminate 8, and then the FSW is performed. Thus, viscosity of the metal member is increased, so that when pores are generated, the pores can be inhibited from being coalesced with each other, and release of the gas to the outside caused by pore flotation can be inhibited. Further, sphericity of the pores of the completed functionally gradient material 14 can be improved. Furthermore, since the pore structure stabilization agent 4 functions also as pore-forming nuclei, the porosity can be improved. Incidentally, the present embodiment is described using an example in which the pore structure stabilization agent 4 is added; however, the pore structure stabilization agent 4 is not necessarily to be added, and the pores may also be formed without adding the pore structure stabilization agent 4.

By performing heat treatment again on the functionally gradient material produced in the present embodiment, the mechanical property of the functionally gradient material can be improved. For example, in the case where the aluminum alloy is a 6000 series aluminum alloy, since the mechanical property can be improved by performing heat treatment, by performing heat treatment again on part or all of the functionally gradient material (which has become porous material by performing the heat treatment process) at a temperature of 100° C. to 250° C., the mechanical property of the functionally gradient material can be improved. In the case where only a part of the functionally gradient material is subjected to heat treatment, mechanical property of a part of one functionally gradient material can be improved, and therefore higher functional gradient can be achieved.

[Modification 1]

Figure 18A:
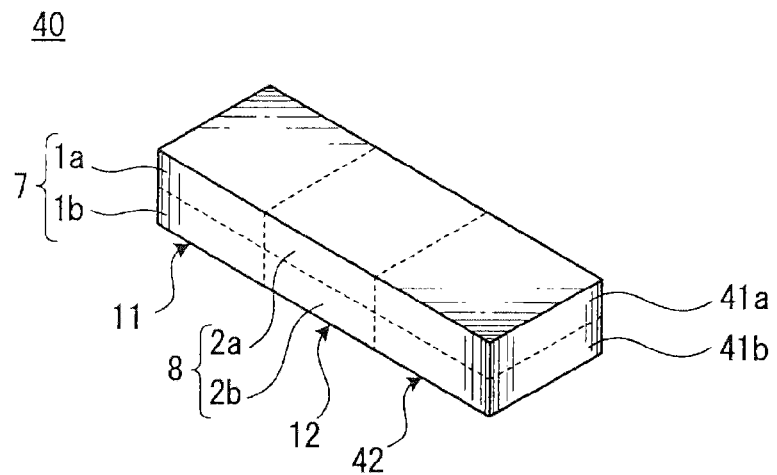
FIGS. 18A and 18B are respectively a schematic perspective view of a functionally gradient material precursor and a schematic configuration view of a functionally gradient material formed in modification 1.

Next, a functionally gradient material precursor and a functionally gradient material according to modification 1 will be described below with reference to the FIGS. 18A and 18B. Modification 1 is an example in which three laminates formed by different material compositions are joined. In FIGS. 18A and 18S, like components are denoted by like reference numerals as of FIGS. 14 and 15, and the explanation thereof will be omitted.

As shown in FIG. 18A, a functionally gradient material precursor 40 in modification 1 is formed by joining a first metal foam precursor 11, a second metal foam precursor 12, and a third metal foam precursor 42, wherein the material composition of the third metal foam precursor 42 is different from those of the first metal foam precursor 11 and second metal foam precursor 12. For example, a pair of third metal plates 41*a*, 41*b* formed of an aluminum alloy with high corrosion resistance (JIS A5083) is used to constitute the third metal foam precursor 42. In such a case, similar to the production method of the first metal foam precursor 11 and the second metal foam precursor 12, the third metal foam precursor 42 may also be formed by laminating the third metal plates 41*a*, 41*b* to each other with a blowing agent and a pore structure stabilization agent sandwiched in between, and performing FSW. Further, the joining surfaces of the first, second and third metal foam precursors 11, 12, 42 are respectively formed by performing FSW by the same process as shown in FIGS. 11A to 13.

Figure 18B:
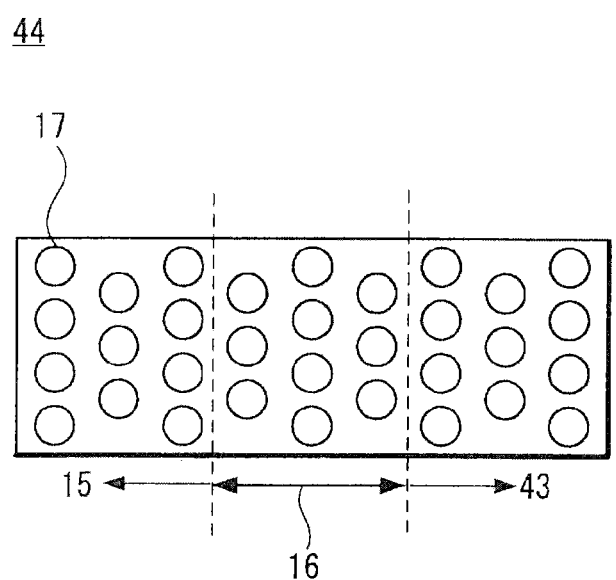

Further, a functionally gradient material 44 as shown in FIG. 18B can be formed by performing the same heat treatment as in the first embodiment on the functionally gradient material precursor 40 formed by the first, second and third metal foam precursors 11, 12, 42. Thus, in the present modification, the functionally gradient material 44 is formed by: the metal foam portion 15 (which is made of pure aluminum that is a relatively soft material), the metal foam portion 16 (which is made of the aluminum alloy that is a material harder than pure aluminum), and a metal foam portion 43 with high corrosion resistance. As described above, according to the present modification, it is possible to add a plurality of functions to one material.

Incidentally, although modification 1 shows an example in which the functionally gradient material 44 composed of three kinds of metal foam portions 15, 16, 43 made of different material compositions is formed, it is also possible to form a functionally gradient material composed of more than three kinds of metal foam portions. Further, similar to the first embodiment, although modification 1 shows an example in which the FSW process for forming the first, second and three metal foam precursor 11, 12, 42 and the FSW process for joining the first, second and three metal foam precursor 11, 12, 42 to each other are separately performed in different steps in modification 1, the two FSW processes may also be performed at the same time.

[Modification 2]

Figure 19:
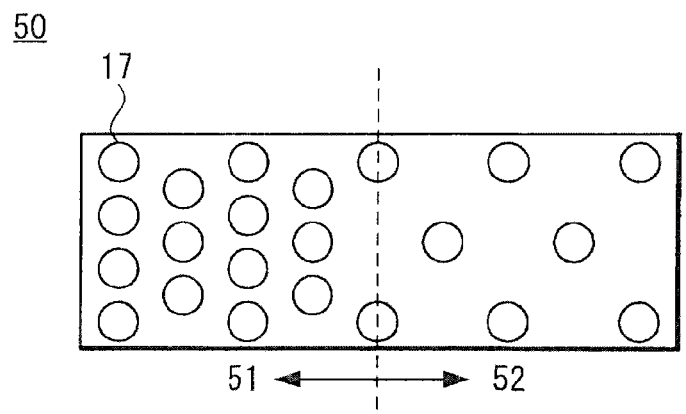
FIG. 19 is a schematic configuration view of a functionally gradient material formed in modification 2.

Next, a functionally gradient material precursor and a functionally gradient material according to modification 2 will be described below with reference to the FIG. 19. Modification 2 is an example in which both the material composition and the porosity are caused to vary. In FIG. 19, like components are denoted by like reference numerals as of FIG. 15, and the explanation thereof will be omitted.

Figure 1B:
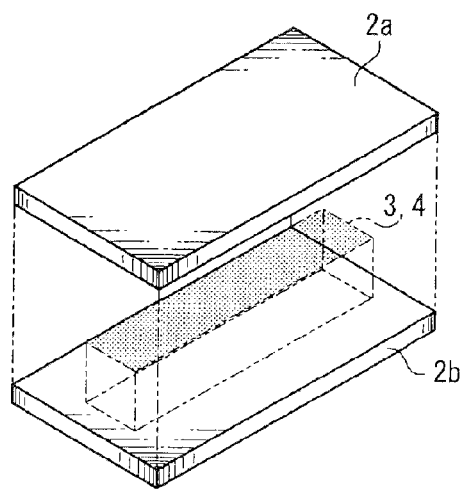

Modification 2 is an example in which the porosity is caused to vary by providing a distribution to the blowing agent contained in the functionally gradient material precursor and the functionally gradient material. In the spread of the blowing agent 3 as shown in FIGS. 1A and 1B, the amount of the blowing agent 3 to be spread to the first laminate 7 and the amount of the blowing agent 3 to be spread to the second laminate 8 are different from each other. For example, in the first laminate 7, the amount of the spread of the blowing agent 3 is 1.0 mass % based on the mass of the first metal plates 1*a*, 1*b* of a volume obtained by multiplying the length (5 mm) of a probe of the friction stir tool (which is to be described later) by the area in which the powder is spread; while in the second laminate 8, the amount of the spread of the blowing agent 3 is 0.2 mass % based on the mass of the second metal plates 2*a*, 2*b* of a volume obtained by multiplying the length (5 mm) of the probe of the friction stir tool (which is to be described later) by the area in which the powder is spread.

Thus, a functionally gradient material 50 is formed as shown in FIG. 19, which has a configuration in which two metal foam portions 51, 52 having different porosities are jointed to each other.

[Modification 3]

Figure 20A:
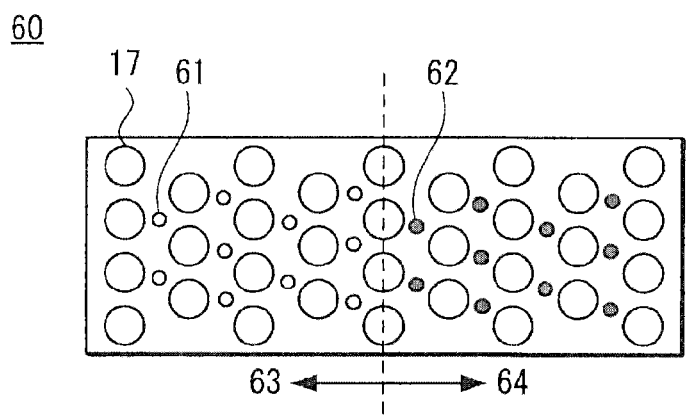
FIGS. 20A and 20B are each a schematic configuration view of a functionally gradient material precursor formed in modification 3.
Figure 20B:
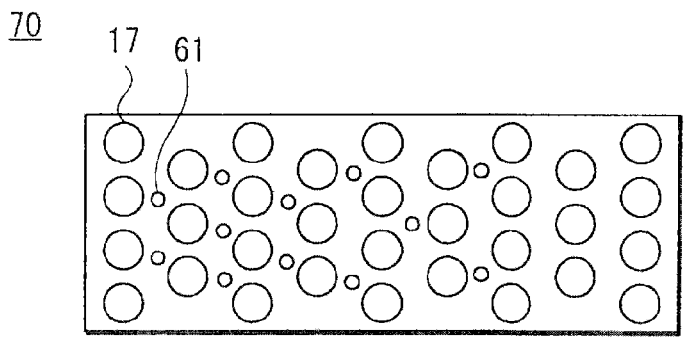

Next, a functionally gradient material precursor and a functionally gradient material according to modification 3 will be described below with reference to the FIGS. 20A and 20B. Modification 3 is an example in which a distribution is provided to the additive(s) added to the functionally gradient material precursor and the functionally gradient material. In FIGS. 20A and 20B, like components are denoted by like reference numerals as of FIG. 15, and the explanation thereof will be omitted.

FIGS. 20A is a schematic configuration view of a functionally gradient material 60 formed in modification 3. FIG. 20A shows an example in which alumina 61 for increasing strength is added to a first metal foam portion 63, and silicon carbide (SiC) 62 is added to a second metal foam portion 64. Further, FIG. 20B shows an example in which a functionally gradient material 70 is formed in which the amount of the alumina 61 added thereto is decreased in a gradient manner from 10% to 0%. The functionally gradient material 70 may be formed by changing the amount of the spread of the additive(s) in the first laminate 7 and the second laminate 8 in the processes shown in FIGS. 1A and 1B.

As shown in modification 3, a functionally gradient material may not only be formed by changing the composition of the metal material that constitutes the metal foam portion, but also be formed by changing the type and amount of the additive(s). Further, similar to the first embodiment, in modification 3, the FSW process for forming each of the metal foam precursors and the FSW process for joining the respective metal foam precursors to each other may either be separately performed in different steps, or be performed at the same time.

<2. Second Embodiment>

Next, a method for producing a functionally gradient material precursor and a functionally gradient material according to a second embodiment of the present invention will be described below with reference to FIGS. 21 to 30C. The present embodiment is an example in which a dense metal portion is joined to an end of a metal foam portion.

Figure 21:
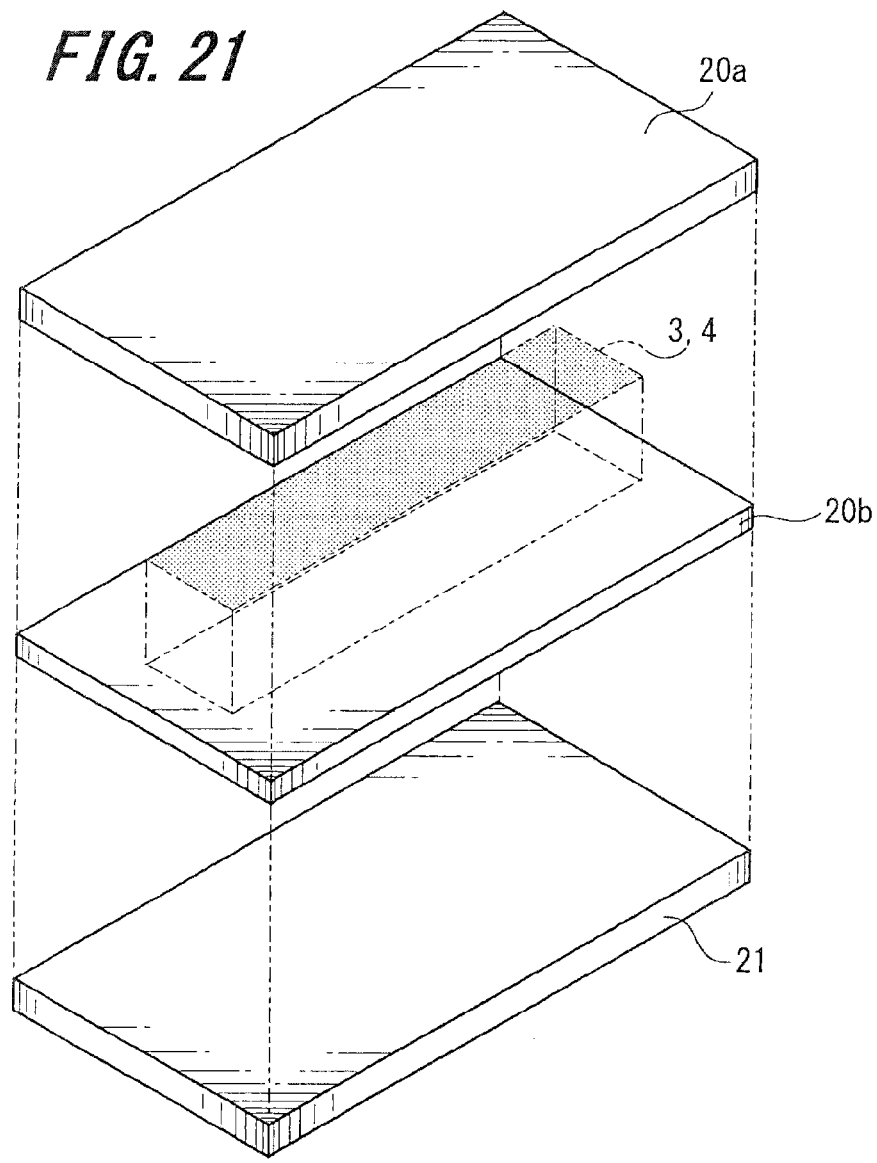
FIG. 21 is a schematic configuration view showing a process for producing a functionally gradient material precursor and a functionally gradient material according to a second embodiment of the present invention.
Figure 22:
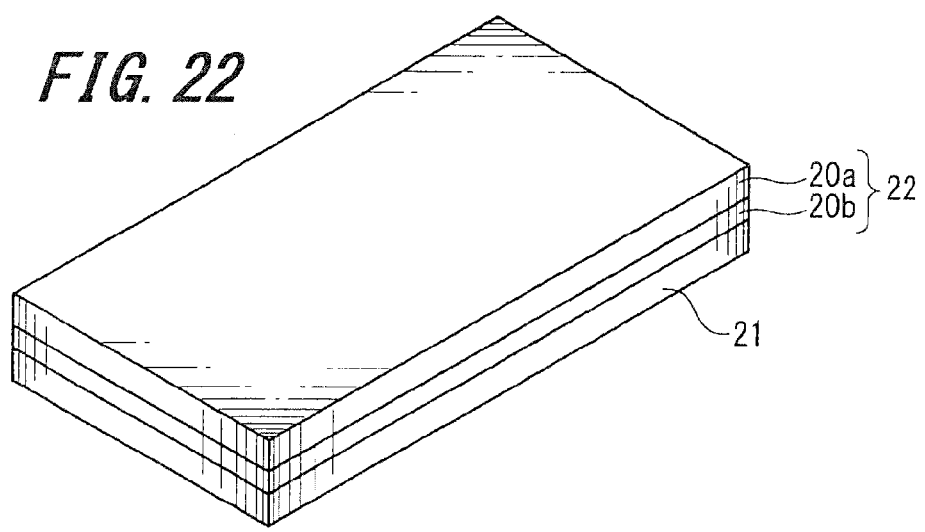
FIG. 22 is a schematic configuration view showing the process for producing the functionally gradient material precursor and the functionally gradient material according to the second embodiment.

First, as shown in FIG. 21, two metal plates 20*a*, 20*b* are prepared, and the two metal plates 20*a*, 20*b* are laminated to each other with powder-like blowing agent 3 and pore structure stabilization agent 4 sandwiched in between, so as to form a laminate 22 as shown in FIG. 22. Further, a dense metal portion 21 is laminated on the lower layer of the laminate 22. The materials of the metal plates 20*a*, 20*b*, the blowing agent 3 and the pore structure stabilization agent 4 may be identical to those used in the first embodiment. Further, the dense metal portion 21 is formed of a metal material having different composition from that of the metal plates 20*a*, 20*b*.

In the present embodiment, two rolled plates of aluminum with a purity of 99.5% (JIS A1050) are used as the two metal plates 20*a*, 20*b*, each rolled plate having a length of 180 mm and a width of 110 mm. Further, the thickness of the metal plate 20*a* of the upper layer is 3 mm, and the thickness of the metal plate 20*b* of the lower layer is 2 mm, so that the thickness of all laminate 22 becomes equal to the length (5 mm) of the probe of the friction stir tool (which is to be described later).

Further, a rolled plate formed by a steel plate (JIS SS400) is used as the dense metal portion 21, wherein the rolled plate has a dimension of: 180 mm (length)×110 mm (width)×3 mm (thickness).

Further, in the present embodiment, titanium hydride (TiH$_2$) powder with a particle size smaller than 45 µm is used as the blowing agent 3, and alumina (α-Al$_2$O$_3$) powder with an average particle size of about 1 µm is used as the pore structure stabilization agent 4; and such blowing agent 3 and pore structure stabilization agent 4 are spread between the two metal plates 20a, 20b. The spread region covers the place through which a friction stir tool moves in a FSW process (which is to be described later). The amount of the spread of the blowing agent 3 and the pore structure stabilization agent 4 is: 1 mass % for the blowing agent 3 and 10 mass % for the pore structure stabilization agent 4, based on the mass of the metal plates 20a, 20b of a volume obtained by multiplying the length (5 mm) of the probe of the friction stir tool (which is to be described later) by the area in which the powder is spread.

Figure 23:
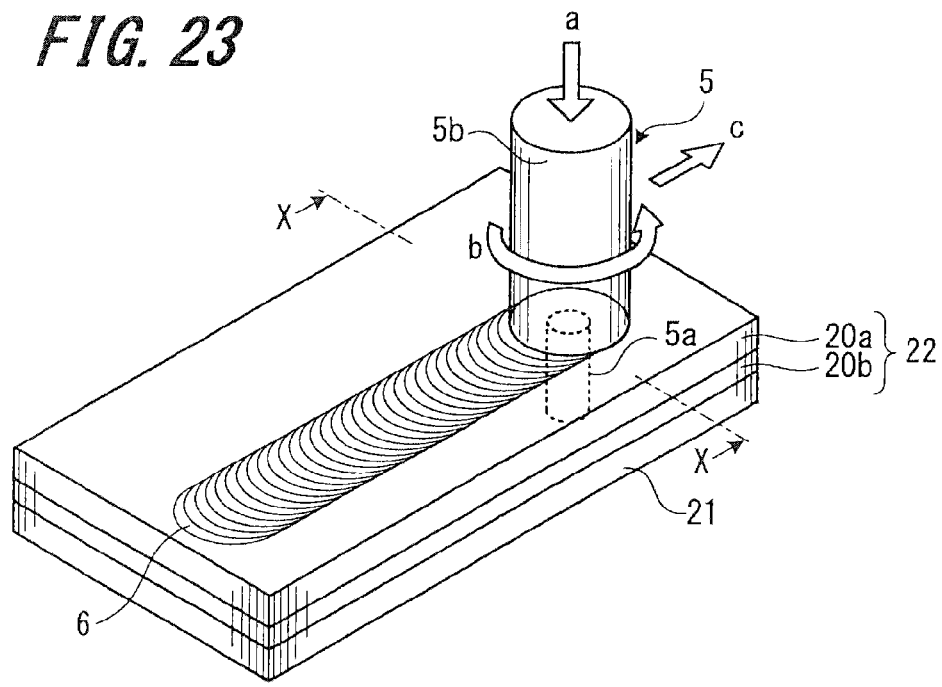
FIG. 23 is a schematic configuration view showing the process for producing the functionally gradient material precursor and the functionally gradient material according to the second embodiment.

Next, as shown in FIG. 23, FSW is performed from a surface of the laminate 22 opposite the surface joining the dense metal portion 21.

In the present embodiment, the FSW is performed in the following manner: the probe 5a of the friction stir tool 5 is penetrated into the laminate 22 from one end of one surface of the laminate 22 by rotating the main body 5b and the probe 5a in a direction indicated by arrow "b" at a predetermined rotation speed while pressing the main body 5b and the probe 5a in a direction indicated by arrow "a". Further, in the state where the probe 5a is penetrated into the laminate 22, the friction stir tool 5 is moved toward the other end of the laminate 22 along a direction indicated by arrow "c".

Figure 24:
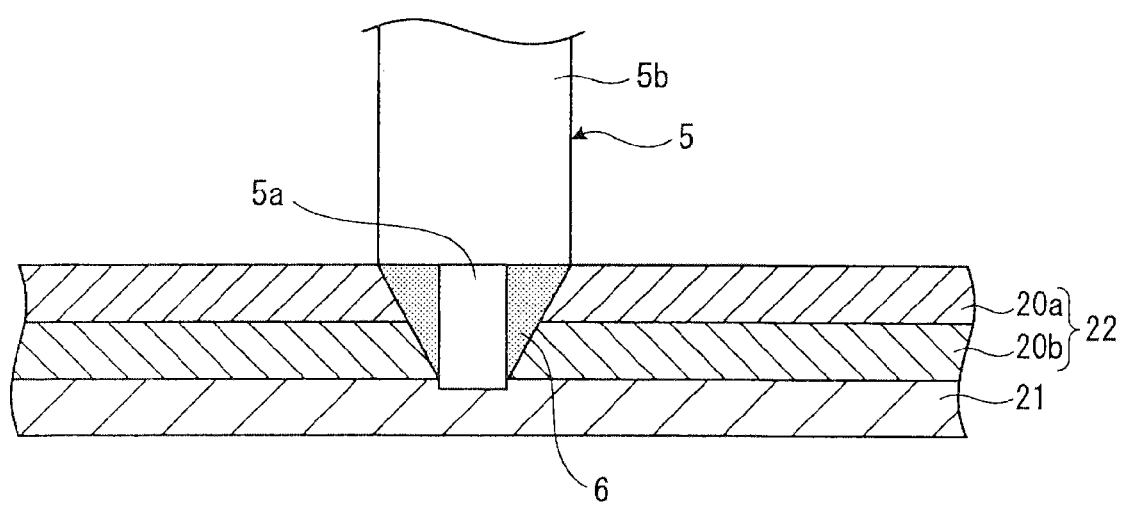
FIG. 24 is a schematic cross section taken along line X-X of FIG. 23.

FIG. 24 is a schematic configuration view showing the cross section taken along line X-X of FIG. 23. In the present embodiment, since the length of the probe 5a is substantially equal to the thickness of the laminate 22, the friction stir is performed in a state where the probe 5a is penetrated through the joining surface between the two metal plates 20a, 20b, which constitute the laminate 22, and the tip end of the probe 5a is slightly cut into the dense metal portion 21, as shown in FIG. 24. Further, by performing the FSW, frictional heat is generated between the laminate 22 and the friction stir tool 5, so that a stir zone 6 is formed in the portion where friction stir is performed.

In the present embodiment, the friction stir is also performed using multipass method with the same FSW device as used in the first embodiment. The rotation speed of the friction stir tool 5 is set to 2200 rpm, the traverse speed of the friction stir tool 5 is set to 100 mm/min, and the angle of advance of the friction stir tool 5 is set to 3°.

Figure 25:
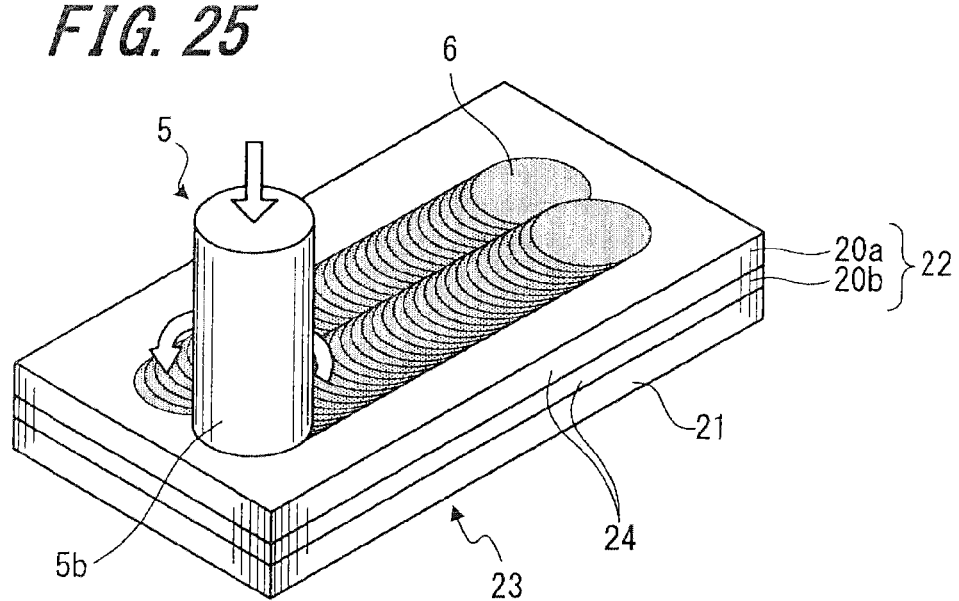
FIG. 25 is a schematic configuration view showing the process for producing the functionally gradient material precursor and the functionally gradient material according to the second embodiment.

FIG. 25 is a schematic configuration view showing a state where the same area has been stirred twice by performing FSW using the multipass method from one end toward the other end of the laminate 22. In the present embodiment, the metal plates 20a, 20b, the blowing agent 3 and the pore structure stabilization agent 4 are homogeneously mixed in the stir zone 6, while the two metal plates 20a, 20b and the dense metal portion 21 are joined to each other. Thus, the portion of the laminate 22 becomes a metal foam precursor 24, and at the same time the metal foam precursor 24 and the dense metal portion 21 are joined to each other, so that a functionally gradient material precursor 23 is formed.

Figure 26:
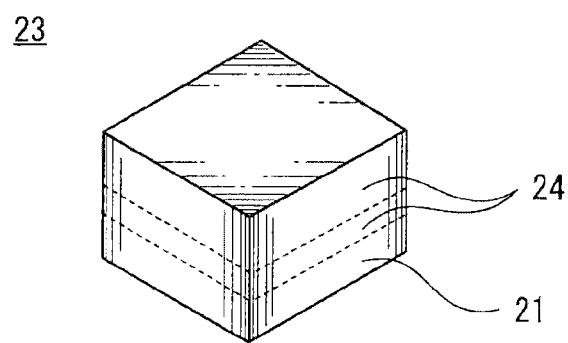
FIG. 26 is a schematic perspective view showing the functionally gradient material precursor produced by the second embodiment.

Next, the functionally gradient material precursor 23 formed in the aforesaid process is heated at a temperature neat the melting point thereof. In the present embodiment, as shown in FIG. 26, the portion of the functionally gradient material precursor 23 having been subjected to the FSW process is cut to obtained a cut portion of functionally gradient material precursor 23 having a dimension of 12 mm (length)×12 mm (width)×8 mm (thickness), and the cut portion of the functionally gradient material precursor 23 is subjected to a heat treatment. In other words, in the present embodiment, the cut portion of the functionally gradient material precursor 23 is put into an electric furnace (trade name: KDF-S80, manufactured by: Denken Co., Ltd.) previously heated to 1003K, held at such temperature for 9 minutes and 30 seconds, and then taken out from the electric furnace to be air-cooled.

Figure 27:
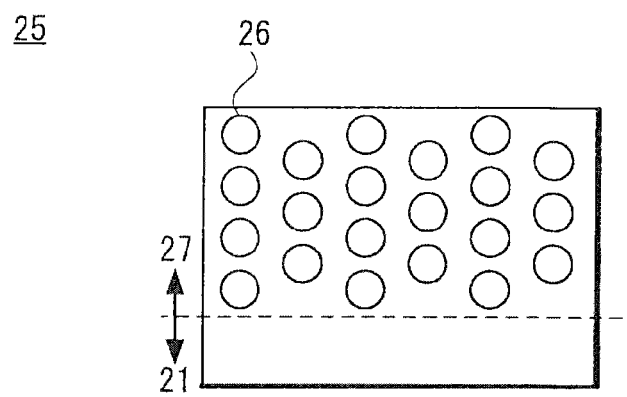
FIG. 27 is a schematic configuration view showing the functionally gradient material produced by the second embodiment.

FIG. 27 is a schematic configuration view of a functionally gradient material 25 formed in the present embodiment. As shown in FIG. 27, by performing the heat treatment process, pores 26 are generated only in the area which was the metal foam precursor 24 so that such area becomes a metal foam portion 27, and therefore the functionally gradient material 25 of the present embodiment is in a state where the metal foam portion 27 and the dense metal portion 21 are joined to each other. Further, in the present embodiment, since the joining portion of the metal foam precursor 24 and the dense metal portion 21 is mixed by the friction stir in the functionally gradient material precursor 23, the intermediate zone between the metal foam portion 27 and the dense metal portion 21, which are formed of different material compositions, is in a state where different compositions are mixed with each other. In other words, the functionally gradient material 25 of the present embodiment is in a state where the material composition and porosity vary in a gradient manner from the metal foam portion 27 toward the dense metal portion 21.

Next, observation result of the composition distribution of both the functionally gradient material precursor 23 and the functionally gradient material 25 of the present embodiment formed by performing the aforesaid process will be described below.

The details of how the material compositions of the functionally gradient material precursor 23 and the functionally gradient material 25 obtained in the present embodiment vary in a gradient manner were observed by analyzing the distributions of aluminum (Al) element and iron (Fe) with an electron probe micro-analyzer (EPMA). Such observation was performed on the cross-sections of the functionally gradient material precursor 23 and the functionally gradient material 25, perpendicular to the scanning direction of the FSW.

When observing the cross-sections, the observation cross-sections of both the functionally gradient material precursor 23 and the functionally gradient material 25 were polished by a polishing paper (polished by an emery paper up to No. 1200), and then further polished by electrolytic polishing.

Figure 28A:
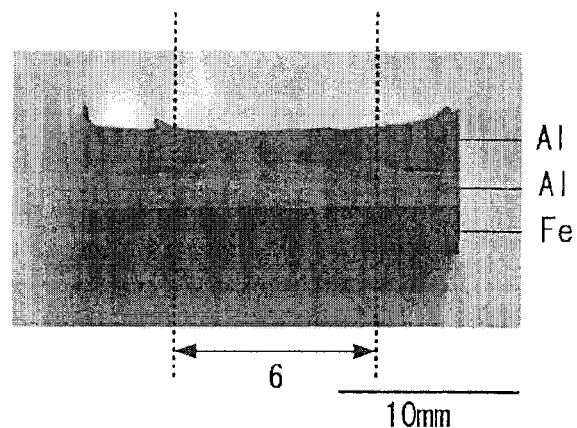
FIGS. 28A and 28B are respectively a photograph showing the appearance of the functionally gradient material precursor produced by the second embodiment and an enlarged photograph showing a primary portion of the functionally gradient material precursor.

FIG. 28A is a photograph showing the appearance of the observation cross-section of the functionally gradient material precursor 23. In the photograph shown in FIG. 28A, the upper layer is the metal foam precursor 24, and the lower layer is the dense metal portion 21. The white color region of the metal foam precursor 24 shown in FIG. 28A shows the alumina, which provides an indication of details of stir. Onion rings (which are peculiar to FSW) are confirmed in the area passed by the probe 5a (i.e., the stir zone 6) in the central portion, so that it is known that aluminum, blowing agent and alumina are mixed in such area. Further, it is known that the two metal plates 20a, 20b and the dense metal portion 21 are well joined over the whole stir zone 6.

Figure 28B:
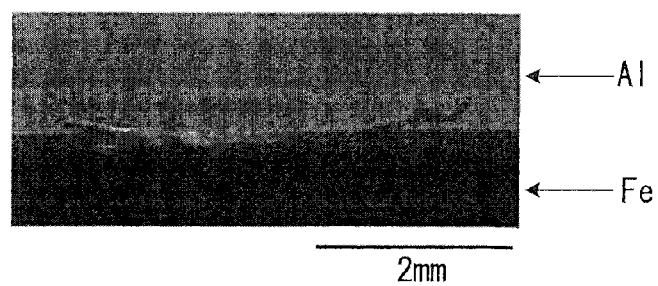

FIG. 28B is an enlarged photograph showing the area near the interface between the metal foam precursor 24 and the 21 in the stir zone 6 shown in FIG. 28A. It is observed from FIG. 28B that, in the interface between the metal foam precursor 24 and the dense metal portion 21, aluminum (which forms the metal foam precursor 24) invades into the dense metal portion 21, and something looks like burr of the steel, which forms the dense metal portion 21, sticks into the metal foam precursor 24. Based on this, it is considered that, in the FSW, the tip end of the probe 5a reaches the surface of the dense metal portion 21, although slightly, so that the dense metal portion 21 is joined with aluminum which forms the metal foam precursor 24.

Figure 29A:
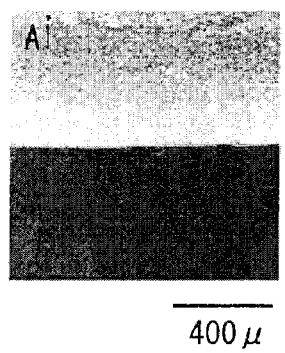
FIGS. 29A and 29B are photographs showing observation results of EPMA of the functionally gradient material precursor produced by the second embodiment.
Figure 29B:
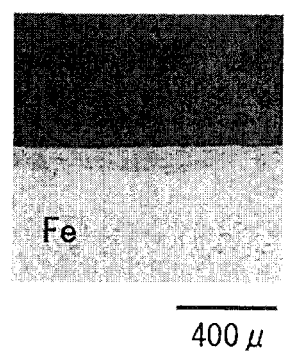

FIGS. 29A and 29B show an observation result obtained by observing the distribution of aluminum (Al) element and iron (Fe) element near the interface between the metal foam precursor 24 and the dense metal portion 21 in the stir zone 6 shown in FIG. 28A with an EPMA. The existence of aluminum, which forms the metal foam precursor 24, is slightly observed in the dense metal portion 21; however, no significant diffusion across the interface between aluminum element and iron element is observed. It is considered that this is because a mechanical joint having anchor effect has been generated.

Figure 30A:
FIG. 30A is a photograph showing the appearance of the functionally gradient material produced by the second embodiment.

FIG. 30A is a photograph showing the appearance of a material obtained by foaming the stir zone shown FIG. 28A. It is known from FIG. 30A that, after the foaming process, the joint between aluminum (which forms the metal foam portion 27) and the dense metal portion 21 is also maintained, and the metal foam portion 27 and the dense metal portion 21 are not separated from each other.

Figure 30B:
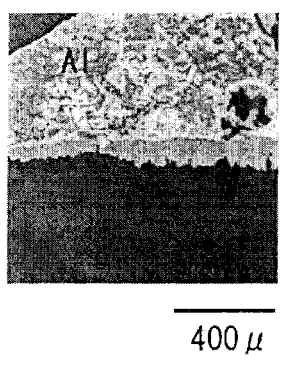
FIGS. 30B and 30C are observation results of EPMA corresponding to the photograph shown in FIG. 30A.
Figure 30C:
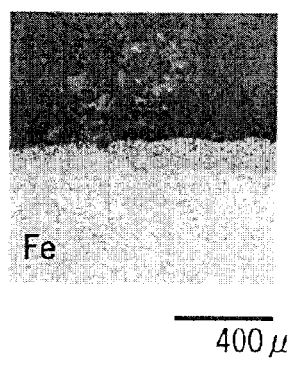

FIGS. 30B and 30C show an observation result obtained by observing the distributions of aluminum element and iron element near the interface between the metal foam portion 27 and the dense metal portion 21 shown in FIG. 30A with an EPMA. It is observed that, in the interface, there are regions where two elements are detected. It is considered that this is because significant diffusion occurs, the two materials are diffusion-joined, and a Fe—Al intermetallic compound is generated.

Further, iron element is also detected within the metal foam portion 27. It is considered that this is because, when performing the foaming process, the Fe—Al intermetallic compound generated in the interface between the metal foam portion 27 and the dense metal portion 21 is moved into the semi-molten aluminum due to the motion of solution such as drainage. However, it has been confirmed that such distribution of the iron element in the metal foam portion 27 is limited to the region near the interface between the metal foam portion 27 and the dense metal portion 21, instead of being distributed over the whole metal foam portion 27.

Incidentally, as a comparative example, an experiment was performed in which the foaming process was performed in a state where the metal foam precursor was laid on the top of the dense metal portion. In such comparative example, the metal foam precursor was formed by the same method as that of the first embodiment, and the dense metal portion and the metal foam precursor were not joined to each other. As a result, it is known that, if the foaming process is simply performed in a state where the metal foam precursor is laid on the top of the dense metal portion, the metal foam portion and the dense metal portion will not be joined to each other, and the metal foam portion and the dense metal portion can be easily separated from each other.

It is presumed from the result of the comparative example that, in the present embodiment in which the metal foam precursor 24 and the dense metal portion 21 are joined to each other by performing FSW, the diffusion-joining is performed during a foaming process in which the oxide films of both the metal foam precursor 24 and the dense metal portion 21 are broken down, and new surfaces are formed.

Thus, according to the present embodiment, by joining the dense metal portion 21 and the metal foam portion 27 to each other, it is possible to form a functionally gradient material whose material composition and porosity vary in a gradient manner.

Further, according to the present embodiment, since it is possible to obtain a functionally gradient material formed by joining the metal foam portion 27 and the dense metal portion 21 to each other, the functionally gradient material can be applied to a wide variety of components, such as facilitating painting operation when being used for producing automobile components, and facilitating joining the functionally gradient material to other components when assembling product. Further, the advantages identical to those of the first embodiment can be achieved.

Conventionally, process of combining a metal foam (a general porous material) with a dense metal is mainly performed using an adhesive. However, usage of the adhesive will cause many problems such as: it has high environmental burden, it will increase difficulty in recycle, adhesive will be softened in hot environment, and the like. However, in the present embodiment, since the metal foam portion and the dense metal portion can be joined to each other by FSW without using adhesive, the conventional problems can be solved.

In the present embodiment, the dense metal portion 21 is laminated in the laminating direction of the laminate 22 (which forms the metal foam portion 27); however, the dense metal portion 21 may also be joined to a lateral face of the laminate 22 perpendicular to the laminating direction of the laminate 22. In such a case, the functionally gradient material precursor and the functionally gradient material according to the present invention can be achieved by performing FSW on the laminate 22 and performing FSW on the joining surface between the laminate 22 and the dense metal portion 21.

Further, although the present embodiment is described based on an example in which the functionally gradient material 25 is formed by joining the dense metal portion 21 with one kind of metal foam portion 27, it is also possible to form a functionally gradient material by joining a dense metal portion with part or all of two kinds of metal foam precursors, which constitute the functionally gradient material precursor 13 formed in the first embodiment. In such a case, FSW may be performed on the joining surface between the joining surface between the dense metal portion and the metal foam precursor joined to the dense metal portion. Further, although the present embodiment is described based on an example in which the functionally gradient material 25 is formed by joining the metal foam portion 27 with the dense metal portion 21 wherein the metal foam portion 27 has different material composition from that of the dense metal portion 21, the present invention also includes an example in which a functionally gradient material is formed by joining a metal foam portion with a dense metal portion wherein the metal foam portion and the dense metal portion have the same material composition. In such a case, a functionally gradient material having gradient porosity is formed.

The aforesaid first and second embodiments are examples in which the metal foam precursor, which constitutes the functionally gradient material precursor, is formed by sandwiching the blowing agent between a pair of metal plates to form a laminate, and performing. FSW from one surface of the laminate; however, the production method of the metal foam precursor is not limited to such method, and the object of the present invention may also be achieved by employing a die-casting method. The following is an example of the die-casting method.

<3. Third Embodiment>

Next, a method for producing a functionally gradient material precursor and a functionally gradient material according to a third embodiment of the present invention will be described below with reference to FIGS. 31A to 3B. The present embodiment is an example in which the functionally gradient material precursor and the functionally gradient material are formed of die-cast materials.

Figure 31A:
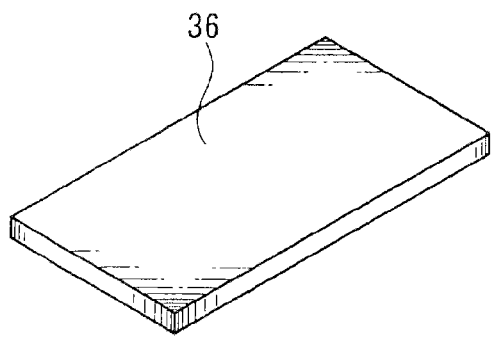
FIGS. 31A and 31B are views showing a process for producing a functionally gradient material precursor and a functionally gradient material according to a third embodiment of the present invention.
Figure 31B:
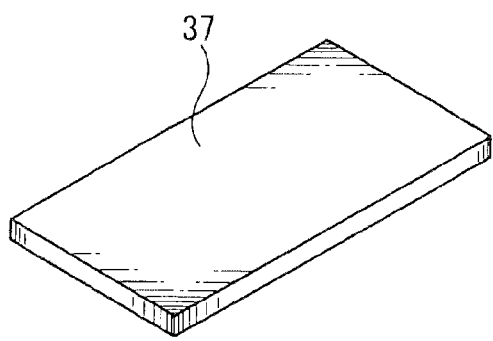

First, as shown in FIGS. 31A and 31B, a first metal member 36 and a second metal member 37 are formed by a die-casting method. A die-casting method is a casting method capable of producing a large number of high-precision castings in short time by pressing molten metallic material into a given die. Examples of the die-casting method include: a general air opening die-casting method, a vacuum die-casting method, a squeeze die-casting method, a non-porous (oxygen substitution) die-casting method, a semi-molten/semi-solid die-casting method, and the like. The vacuum die-casting method is a method in which a molten metal is poured into the cavity of a die in a state where the pressure of the cavity is reduced so that the occurrence of enclosing blow hole is prevented; the squeeze die-casting method is a method in which a molten metal is poured into the cavity at low speed, and a pressure is applied to the molten metal to solidify the molten metal; the non-porous (oxygen substitution) die-casting method is a method in which oxygen is filled in the cavity, so that the occurrence of hole is prevented because the pressure of the cavity is reduced by the action of the oxygen; and the semi-molten/semi-solid die-casting method is a method in which a metallic material in a state where solid and liquid are mixed like sherbet is pressed into a die.

In the die-casting method, examples of the metallic material possible to be pressed into the die include: Al—Si—Cu aluminum alloys for die-casting (JIS: ADC12, ADC10, ADC10Z, ADC12Z, ADC14), Al—Si aluminum alloys for die-casting (JIS: ADC1), Al—Si—Mg aluminum alloys for die-casting (JIS: ADC3), and Al—Mg aluminum alloys for die-casting (JIS: ADC5, ADC6). In addition to the aforesaid materials, other materials for die-casting, such as magnesium, magnesium alloys, zinc, zinc alloys, copper, copper alloys and the like, can be used as the material to be pressed into the die.

Usually, the metal member formed by the die-casting method has gas and pore-forming nuclei contained therein. The gas originates from the air mixed into the molten metal when the molten metal is poured into the die of a die-casting device at extremely-high speed so as to be contained within the metal member, or is generated when mold-releasing agent coated on the die evaporates when contacting the molten metal and is mixed into the molten metal so as to be contained within the metal member. The pore-forming nuclei are originally contained in the raw material of the metallic material, or are contained during the casting process by the die-casting method. For example, in the case of forming a metal member constituted by aluminum or aluminum alloy, the pore-forming nuclei will be primary crystal Si, eutectic Si, Al—Fe—Si compound, Al—Cu compound and/or the like. Further, in the case of forming a metal member constituted by magnesium or magnesium alloy, the pore-forming nuclei will be Mg—Al compound, Mg—(Al, Zn) compound and/or the like.

In the present embodiment, an air opening die-casting method is used to press a molten metallic material into a die under a casting pressure of 70 MPa to form the first metal member 36 and the second metal member 37, wherein the second metal member 37 has different material composition from that of the first metal member 36.

Figure 32:
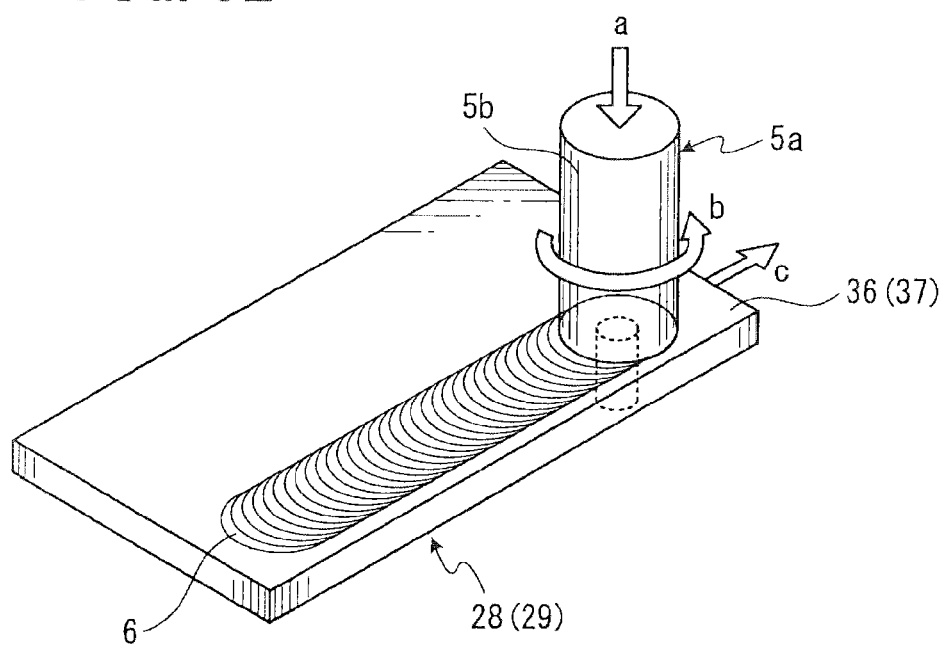
FIG. 32 is a schematic configuration view showing the process for producing the functionally gradient material precursor and the functionally gradient material according to the third embodiment.
Figure 33:
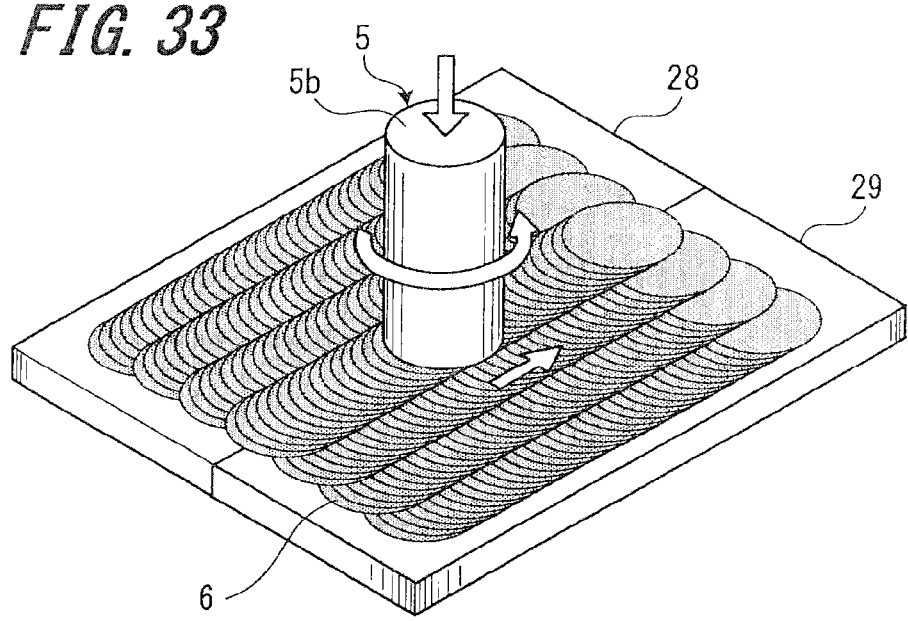
FIG. 33 is a schematic configuration view showing the process for producing the functionally gradient material precursor and the functionally gradient material according to the third embodiment.

Next, as shown in FIG. 32, a friction stir processing (FSP) is performed respectively on the first metal member 36 and the second metal member 37. FSP is a technique identical to FSW. In the present embodiment, the FSP is performed by multipass method with a FSW device having the same configuration as that of the first embodiment.

By performing the FSP, the gas and pore-forming nuclei contained in the first metal member 36 and the second metal member 37 homogeneously disperse within the first metal member 36 and the second metal member 37. Thus, the first metal member 36 becomes a first metal foam precursor 28, and the second metal member 37 becomes a second metal foam precursor 29.

Next, similar to the process shown in FIGS. 11A and 112, an adjustment is performed by respectively machining the first metal foam precursor 28 and the second metal foam precursor 29 so that a surface of the friction-stirred portion is exposed on an end.

Next, as shown in FIG. 12, the surface of the friction-stirred portion of the first metal foam precursor 28 and the surface of the friction-stirred portion of the second metal foam precursor 29 are butted against each other, and FSW is performed on the contact face of the both precursors. In the present embodiment, the FSW is performed on the contact face under a condition of: the rotation speed of the friction stir tool 5 is set to 1000 rpm, the traverse speed of the friction stir tool 5 is set to 100 mm/min, and the angle of advance of the friction stir tool 5 is set to 3°. Further, the FSW on the contact face may also be performed using the multipass method; and in the present embodiment, similar to the first embodiment, by reversing the scanning direction, the friction stir is performed twice on the same area.

Figure 34:
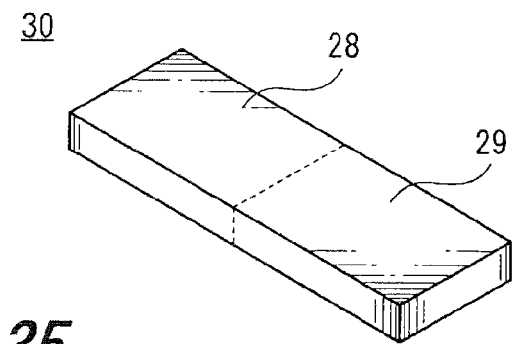
FIG. 34 is a schematic perspective view showing the functionally gradient material precursor produced by the third embodiment.

By performing the aforesaid process, the first metal foam precursor 28 and the second metal foam precursor 29 are joined to each other, and a functionally gradient material precursor 30 whose material composition varies in a gradient manner is formed, as shown in FIG. 34.

Figure 35:
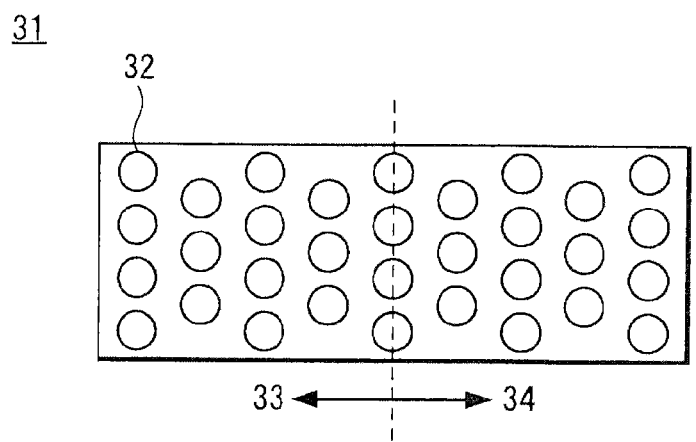
FIG. 35 is a schematic configuration view showing the functionally gradient material produced by the third embodiment.

Thereafter, the functionally gradient material precursor 30 is heated in the same manner as the first embodiment, and thereby the gas already existed in the functionally gradient material precursor 30 expands, and further, due to the pore-forming nuclei already existed in the functionally gradient material precursor 30, pores occur and expand. Thus, as shown in FIG. 35, the portion that was the first metal foam precursor 28 becomes a first metal foam 33, and the portion that was the second metal foam precursor 29 becomes a second metal foam 34, so that a functionally gradient material 31 of the present embodiment is formed.

In the present embodiment, the functionally gradient material 31 having gradient material composition can be formed by joining the first metal foam precursor 28 and the second metal foam precursor 29, which are formed of die-cast materials with different material compositions, to each other by FSW and performing heating treatment.

According to the present embodiment, since the first metal foam precursor 28 and the second metal foam precursor 29 are formed of die-casting materials, expensive blowing agent powder is not necessary; and further, since production process is simple compared with conventional powder metallurgical method, productivity can be improved and cost can be reduced.

The aforesaid first, second and third embodiments may also be carried in combination, and various modifications can be made.

For example, one metal foam precursor for forming the functionally gradient material precursor can be formed by the method of the first embodiment, and the other metal foam precursor can be formed by the die-casting method of the third embodiment. Further, it is also possible to form a functionally gradient material having the same configuration as that of the second embodiment by joining a dense metal portion to the metal foam precursor formed in the third embodiment.

Further, in the first embodiment, if the first metal plate 1a of the upper layer and the first metal plate 1b of the lower layer of the first laminate 7 are formed by different metallic materials with different material compositions, it will be easy to obtain a functionally gradient material formed by joining metal foams formed by different materials. In such a case, the friction stir welding for joining the first metal plates 1a, 1b of the upper layer and the lower layer and the friction stirring for dispersing the blowing agent 3 within the first metal plates 1a, 1b can be carried out by performing FSW in one step, i.e., the process for forming the metal foam precursor and the process for joining the metal plates can be performed in one step.

Further, although the third embodiment gives an example in which a functionally gradient material precursor is formed by joining two kinds of metal foam precursors, the present invention also includes an example in which a functionally gradient material precursor is formed by joining plural kinds of metal foam precursors each having different material composition, like the case described in modifications of the first embodiment.

Thus, according to the present invention, it is possible to form a functionally gradient material precursor and a functionally gradient material constituted by plural kinds (two kinds in the present embodiment) of metallic materials each having different material composition and porosity.

According to the present invention, it is possible to easily obtain a functionally gradient material formed by joining plural kinds of metal foam portions each formed of different material to each other, and it is possible to easily obtain a functionally gradient material formed by joining a metal foam portion having a plurality of pores and a dense metal portion having no pore to each other.

Thus, the functionally gradient material formed by integrating plural kinds of materials, each having different material composition or both different material composition and different porosity, can be applied to automobile components by providing gradient function according to usage, and can be used as high-functional material.

EXPLANATION OF REFERENCE NUMERALS 1a first metal plate
1b first metal plate
2a second metal plate
2b second metal plate
3 blowing agent
4 pore structure stabilization agent
5 friction stir tool
5a probe
5b main body
6 stir zone
7 first laminate
8 second laminate
9 groove
10 recessed portion
11 first metal foam precursor
12 second metal foam precursor
13 functionally gradient material precursor
14 functionally gradient material
15 metal foam portion
16 metal foam portion
17 pore
20a metal plate
20b metal plate
21 dense metal portion
22 laminate
23 functionally gradient material precursor
24 metal foam precursor
25 functionally gradient material
26 pore
27 metal foam portion
28 first metal foam precursor
29 second metal foam precursor
30 functionally gradient material precursor
31 functionally gradient material
33 first metal foam
34 second metal foam
36 first metal member
37 second metal member

The invention claimed is:

1. A method for producing a functionally gradient material precursor comprising the steps of:
forming a plurality of metal foam precursors by forming a plurality of assemblies each including metal members and blowing agents, and performing friction stir welding on each of the plurality of assemblies so that the blowing agents are caused to disperse within the metal members and the metal members are joined to each other, wherein material compositions of the respective metal members of the plurality of assemblies are different, and at least one of the plurality of assemblies compirses a laminate including a blowing agent and a pair of metal plates laminated to each other with the blowing agent sandwiched in between; and
forming the functionally gradient material precursor by arranging the plurality of metal foam precursors formed in the step of forming the metal foam precursors so as to contact each other, and performing friction stir welding on the plurality of metal foam precursors arranged so as to contact each other in the step of forming the plurality of metal foam precursors, by arranging the plurality of assemblies so as to contact each other, and performing friction stir welding on all of the plurality of assemblies arranged so as to contact each other.

2. The method for producing the functionally gradient material precursor according to claim 1, wherein, in the step of forming the functionally gradient material precursor by performing friction stir welding on the plurality of metal foam precursors arranged so as to contact each other, a dense metal portion formed of a desired material composition is friction stir welded to part or all plurality of metal foam precursors.

3. A method for producing a functionally gradient material comprising the steps of:
forming a plurality of metal foam precursors by forming a plurality of assemblies each including metal members and blowing agents, and performing friction stir welding on each of the plurality of assemblies so that the blowing agents are caused to disperse within the metal members and the metal members are joined to each other, wherein material compositions of the respective metal members of the plurality of assemblies are different, and at least one of the plurality of assemblies comprises a laminate including a blowing agent and a pair of metal plated laminated to each other with the blowing agent sandwiched in between,
forming a functionally gradient material precursor by arranging the plurality of metal foam precursors formed in the step of forming metal foam precursors so as to contact each other, and performing friction stir welding on the plurality of metal foam precursors arranged so as to contact each other, or in the step of forming the plurality of metal foam precursors, by arranging the plurality of assemblies so as to contact each other, and performing friction stir welding on all of the plurality of assemblies arranged so as to contact each other; and forming the functionally gradient material by performing heat treatment on the functionally gradient material precursor formed in the step of forming a functionally gradient material precursor so that each interior of the metal foam precursors is foamed to form metal foam portions.

* * * * *